US012699256B2

(12) United States Patent
Matsushita et al.

(10) Patent No.: US 12,699,256 B2
(45) Date of Patent: Aug. 4, 2026

(54) INFRARED IMAGING LENS AND INFRARED CAMERA

(71) Applicant: Nippon Electric Glass Co., Ltd., Otsu (JP)

(72) Inventors: Yoshimasa Matsushita, Otsu (JP); Fumio Sato, Otsu (JP); Nobuo Hori, Higashimatsuyama (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 384 days.

(21) Appl. No.: 18/256,263

(22) PCT Filed: Nov. 22, 2021

(86) PCT No.: PCT/JP2021/042751
§ 371 (c)(1),
(2) Date: Jun. 7, 2023

(87) PCT Pub. No.: WO2022/130909
PCT Pub. Date: Jun. 23, 2022

(65) Prior Publication Data
US 2024/0019668 A1 Jan. 18, 2024

(30) Foreign Application Priority Data

Dec. 16, 2020 (JP) ................................. 2020-208736

(51) Int. Cl.
*G02B 13/14* (2006.01)
*G02B 13/00* (2006.01)

(52) U.S. Cl.
CPC ....... *G02B 13/008* (2013.01); *G02B 13/0035* (2013.01)

(58) Field of Classification Search
CPC ... G02B 9/00; G02B 9/12; G02B 9/14; G02B 9/16; G02B 9/32; G02B 13/00;
(Continued)

(56) References Cited

U.S. PATENT DOCUMENTS 3,778,133 A * 12/1973 Tatian .................... G02B 13/14
359/356
4,494,819 A * 1/1985 Lidwell .................. G02B 13/14
359/356
(Continued)

FOREIGN PATENT DOCUMENTS

JP 62-109014 5/1987
JP 2007-241032 A 9/2007
(Continued)

OTHER PUBLICATIONS

International Search Report and Written Opinion and English translation thereof dated Feb. 15, 2022.

*Primary Examiner* — Thong Q Nguyen
(74) *Attorney, Agent, or Firm* — Harness, Dickey & Pierce, P.L.C.

(57) ABSTRACT

An infrared imaging lens (1) includes a plurality of lenses (L1 to L3) which are disposed in respective positions, the plurality of lenses each being made of glass having a refractive index of 2.8 to 4.0 measured at a wavelength of 10 μm, the infrared imaging lens having an image circle having a diameter which is 0.7 times to 1.3 times a focal length of the infrared imaging lens.

20 Claims, 13 Drawing Sheets

L1　L2　L3　　　　　P　S

(58) Field of Classification Search
    CPC .......................... G02B 13/001; G02B 13/0015;
                    G02B 13/002; G02B 13/0035; G02B
                    13/008; G02B 13/14; G02B 13/146;
                                            G02B 13/18
    USPC ........ 359/350–361, 661, 716, 753–754, 784,
                                            359/792
    See application file for complete search history.

(56)                        References Cited

U.S. PATENT DOCUMENTS

| | | | | |
|---|---|---|---|---|
| 6,999,243 | B2 * | 2/2006 | Chipper ......... | G02B 15/143105 |
| | | | | 359/356 |
| 7,042,656 | B2 * | 5/2006 | Chen ...................... | G02B 13/06 |
| | | | | 359/716 |
| 2009/0027766 | A1 | 1/2009 | Izumi et al. | |
| 2009/0067041 | A1 | 3/2009 | Izumi | |
| 2010/0187418 | A1 | 7/2010 | Izumi et al. | |
| 2011/0164142 | A1 | 7/2011 | Izumi et al. | |
| 2012/0019905 | A1 * | 1/2012 | Teraoka ................. | G02B 7/021 |
| | | | | 359/356 |
| 2020/0189964 | A1 | 6/2020 | Matsushita et al. | |

FOREIGN PATENT DOCUMENTS

| | | | |
|---|---|---|---|
| JP | 2009-63942 | A | 3/2009 |
| JP | 2011-128538 | A | 6/2011 |
| JP | 2019-48752 | A | 3/2019 |
| WO | WO-2016/027786 | A1 | 2/2016 |
| WO | WO-2020/105719 | A1 | 5/2020 |

* cited by examiner

NUMERICAL EXAMPLE 1

NUMERICAL EXAMPLE 1

NUMERICAL EXAMPLE 1

SPATIAL FREQUENCY:21cycles/mm    WAVELENGTH:7~14μm

FIG. 10

NUMERICAL EXAMPLE 2

NUMERICAL EXAMPLE 2

WAVELENGTH 10μm

NUMERICAL EXAMPLE 2

WAVELENGTH:7.5～13.5μm

NUMERICAL EXAMPLE 2

SPATIAL FREQUENCY:21cycles/mm   WAVELENGTH:7.5～13.5μm

FIG. 16

NUMERICAL EXAMPLE 3

NUMERICAL EXAMPLE 3

NUMERICAL EXAMPLE 3

INFRARED IMAGING LENS AND INFRARED CAMERA

TECHNICAL FIELD

The present invention relates to an infrared imaging lens and an infrared camera.

BACKGROUND ART

An infrared camera for capturing an image of a subject with use of infrared radiation in a far infrared region, in particular, a wavelength region of approximately 10 µm which is suitable for biodetection, is applied to a surveillance camera, a security camera, an in-vehicle night vision system, and the like. An infrared imaging lens which is applied to such an infrared camera is known.

CITATION LIST

Patent Literatures

[Patent Literature 1]
International Publication No. WO2016/027786 A1
[Patent Literature 2]
Japanese Patent Application Publication Tokukai No. 2011-128538
[Patent Literature 3]
Japanese Patent Application Publication Tokukaisho No. 62-109014

SUMMARY OF INVENTION

Technical Problem

There is a need for an infrared imaging lens which is used in such a far infrared region, which is excellent in resolution, and which can be used as a standard lens. In particular, there is a need to provide an infrared imaging lens having an excellent resolution suited to an image sensor having a pixel pitch approximately equivalent to a wavelength.

An aspect of the present invention has been made by paying attention to the above problem, and an object thereof is to provide an infrared imaging lens which is compatible with an image sensor having a pixel pitch approximately equivalent to a wavelength, which is excellent in resolution, and which can be used as a standard lens.

Solution to Problem

In order to attain the object, an aspect of the present invention is an infrared imaging lens including a plurality of lenses which are disposed in respective positions, the plurality of lenses each being made of glass having a refractive index of 2.8 to 4.0 measured at a wavelength of 10 µm, the infrared imaging lens having, in the image circle, a modulation transfer function of not less than 0.17 in a wavelength range of 7 µm to 14 µm at a spatial frequency of 41.7 cycles/mm.

In order to attain the object, another aspect of the present invention is an infrared imaging lens including a plurality of lenses which are disposed in respective positions, the plurality of lenses each being made of glass having a refractive index of 2.8 to 4.0 measured at a wavelength of 10 µm, the infrared imaging lens having an image circle having a diameter which is 0.7 times to 1.3 times a focal length.

Advantageous Effects of Invention

The aspects of the present invention make it possible to provide an infrared imaging lens which is compatible with an image sensor having a pixel pitch approximately equivalent to a wavelength, which is excellent in resolution, and which can be used as a standard lens.

BRIEF DESCRIPTION OF DRAWINGS

FIG. 10 is an aberration diagram illustrating comatic aberration of the infrared imaging lens in accordance with Numerical Example 2 of the present invention.

FIG. 16 is an aberration diagram illustrating comatic aberration of the infrared imaging lens in accordance with Numerical Example 3 of the present invention.

DESCRIPTION OF EMBODIMENTS

Embodiment

<Overview of Infrared Imaging Lens>

Figure 1:
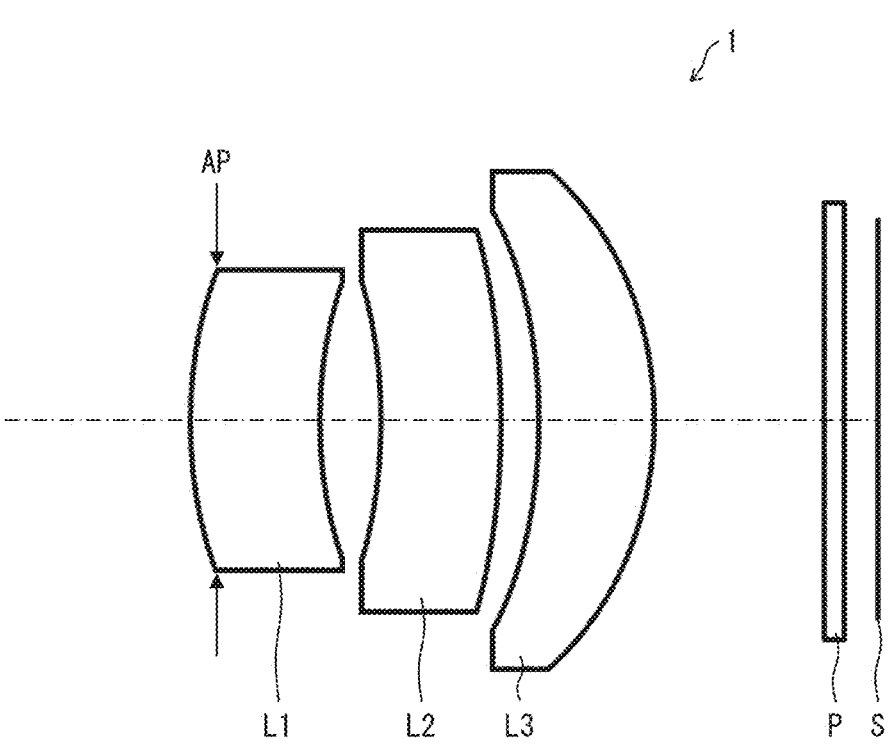
FIG. 1 is a cross-sectional view illustrating a configuration of main parts of an infrared imaging lens in accordance with an embodiment of the present invention.
Figure 2:
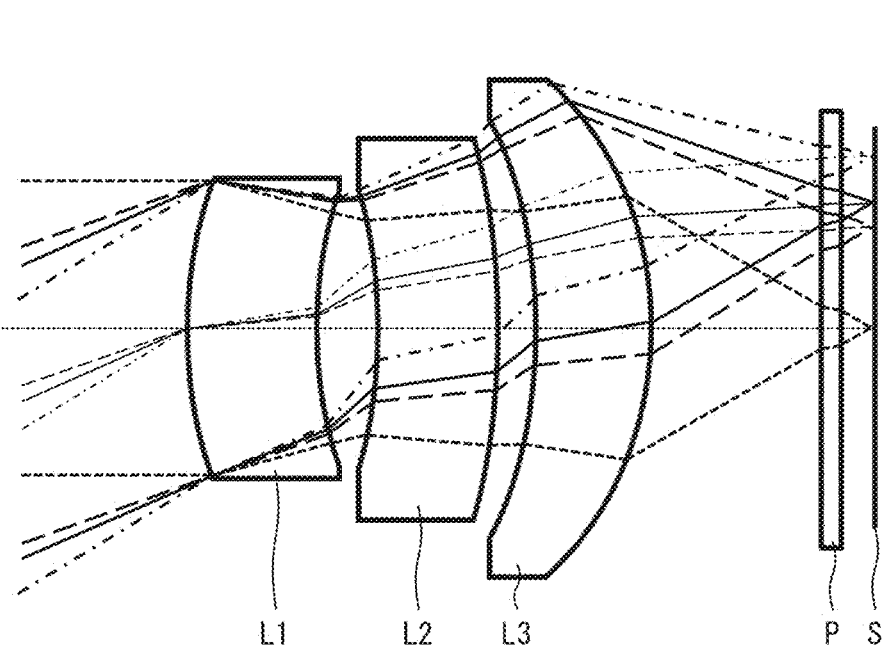
FIG. 2 is an optical path diagram of an infrared imaging lens in accordance with an embodiment of the present invention.

An infrared imaging lens 1 in accordance with an embodiment is a lens system which can handle a far infrared wavelength region and which forms an image of a subject on an image surface S of an image sensor or the like. FIG. 1 is a cross-sectional view illustrating a configuration of main parts of the infrared imaging lens 1 and taken along an optical axis. FIG. 2 is an optical path diagram showing a cross-sectional view of main parts of the infrared imaging lens 1, accompanied by optical paths.

The infrared imaging lens 1 includes a first lens L1, a second lens L2, and a third lens L3 which are disposed in this order from an object side to an image surface S side. The first lens L1 to the third lens L3 uniformly move in the optical axis direction during focusing.

The first lens L1, the second lens L2, and the third lens L3 are each made of glass having a refractive index of 2.8 to 4.0 measured at a wavelength of 10 μm. More specifically, the first lens L1, the second lens L2, and the third lens L3 are each made of chalcogenide glass having a refractive index of 2.8 to 4.0 measured at a wavelength of 10 μm. The first lens L1, the second lens L2, and the third lens L3 can all be made of an identical glass material.

As illustrated in FIGS. 1 and 2, a parallel flat plate P is disposed between the third lens L3 and the image surface S. The parallel flat plate P is an optical window which is hermetically sealed so as to be loaded on the image surface S side, and is made of silicon, hypoxic silicon, or germanium. The material and thickness of the parallel flat plate P can be determined in accordance with what image sensor to employ.

As indicated by the sign "AP" in FIG. 1, an effective diameter of an object-side surface (first surface) of the first lens L1 is equivalent to an aperture of the infrared imaging lens 1. The first lens L1, the second lens L2, the third lens L3, and the parallel flat plate P each have an anti-reflection (AR) coated surface. It is possible to apply an appropriate known technique to such anti-reflection coating in a far infrared region.

<Glass Material for Each Lens>

In particular, it is preferable that the chalcogenide glass contain 20% to 90% of tellurium (Te) in mole percentage and have an Abbe number of not less than 100 measured at a wavelength of 10 μm. Note that the Abbe number as used herein is defined in a numerical example described later. Furthermore, the chalcogenide glass preferably contains at least one of 0% to 50% of germanium (Ge) and 0% to 50% of gallium (Ga) in mole percentage.

The chalcogenide glass having a refractive index of 2.8 to 4.0 measured at a wavelength of 10 μm, that is, having a high refractive index in such a far infrared region, has been developed by the applicant of the present invention (see International Publication No. WO2020/105719A1). This glass material, more specifically, has achieved a refractive index in a range of 2.74 to 3.92 as measured at a wavelength of 10 μm. For example, a refractive index measured at a wavelength of 10 μm is preferably 2.74 to 3.92, 2.8 to 3.8, and particularly preferably 2.9 to 3.7. In a case where the refractive index it too low, the focal length tends to be too long.

It is also preferable that the chalcogenide glass has an Abbe number (V10) of not less than 100, not less than 120, not less than 150, or not less than 180. The Abbe number is particularly preferably not less than 220. The Abbe number (V10) will be defined later. In a case where the Abbe number it too low, chromatic aberration tends to be increased. An upper limit of the Abbe number is not particularly limited, but is practically not more than 350.

The glass material exhibits very little light absorption over a wide range of wavelengths in a far infrared region, as wide as at least a wavelength of 7 μm to 14 μm. In particular, the glass material has a feature of exhibiting, despite being chalcogenide, little light absorption even in a wavelength region of not less than 10 μm. It is possible to use an "infrared absorption edge wavelength" and an "internal transmittance" as indicators, indicating that chalcogenide glass is highly light-transmissive in a far infrared region.

Note here that the infrared absorption edge wavelength refers to an absorption edge wavelength in a far infrared region at a wavelength of not less than 8 μm and is defined by a wavelength at which a light transmittance of 20% is obtained at a thickness of 2 mm of the material. The term "internal transmittance" refers to a transmittance inside the material and does not include a reflection loss on a surface of the material. Chalcogenide glass serving as a glass material of which the first lens L1, the second lens L2, and the third lens are made has an infrared absorption edge wavelength of not less than 18 μm.

Thus, the chalcogenide glass also transmits therethrough infrared radiation having a wavelength of more than 10 μm, and has a good transmittance at least in a wavelength range of 7 μm to 14 μm. The chalcogenide glass has an internal transmittance, measured at a thickness of 2 mm, of not less than 90% at a wavelength of 10 μm.

Further, the glass material is glass and can be pressmolded so as to form a lens having an aspherical surface. Thus, a lens made of this glass material is easily massproduced. The glass material preferably has a glass transition temperature as low as not more than 200° C. and is desirably easily press-molded. In the infrared imaging lens 1, at least one of the lenses is an aspherical lens, so that aberration is prevented or reduced.

In a case where an aspherical lens cannot be applied, an infrared imaging lens for preventing or reducing aberration will be configured to have an increased number of lenses and thus have an increased weight and an increased size. This also results in an imaging lens which is costly and unsuitable for commercial use. Note that "aspherical (surface)" as used herein encompasses "diffractive (surface)".

The chalcogenide glass also makes it possible to form a lens having a surface particularly complicated in shape, such as a diffraction surface. Thus, with use of the chalcogenide glass, a surface of at least one of the lenses of the infrared imaging lens 1 is formed to be a diffractive surface, so that it is possible to satisfactorily inhibit aberration in a wide wavelength range of 7 μm to 14 μm.

Crystalline materials, such as silicon (Si), germanium (Ge), zinc sulfide (ZnS), and zinc selenide (ZnSe), each of which is used as a material that transmits therethrough light in a far infrared region, cannot be press-molded. This makes it difficult to mass-produce an aspherical lens having a complicated shape. It is therefore difficult to use such a crystalline material to achieve a low-cost commercial aspherical lens.

<Matters Concerning Image Surface>

On the image surface S of the infrared imaging lens 1, an image circle has a diameter φs which is equivalent to a focal length f of the infrared imaging lens 1. That is, the infrared imaging lens 1 is a standard lens. More specifically, the diameter φs of the image circle is in a range of 0.7 times to 1.3 times the focal length f. In other words, the following relational expression is satisfied:

$$0.7 \le \varphi s/f \le 1.3.$$

Alternatively, the infrared imaging lens 1 being a standard lens can be defined by a half angle of view of the infrared imaging lens 1 being 21° to 36°.

The infrared imaging lens 1 has a modulation transfer function (MTF) of not less than 0.17 (17%) at a spatial frequency of 41.7 cycles/mm in such an image circle. The reason for focusing on the spatial frequency of 41.7 cycles/mm is described below.

As image sensors in a far infrared region become increasingly smaller in size, pixel pitches of the image sensors have reached a narrow pitch limit approximately equivalent to a wavelength. As an image sensor in a far infrared region with a wavelength of approximately 7 μm to 14 μm, an image sensor having a pixel pitch of 12 μm is commercially available. A spatial frequency of 41.7 cycles/mm corresponds to a Nyquist frequency of an image sensor having a pixel pitch of 12 μm.

Note that the MTF being not less than 0.17 in the image circle indicates that sufficient resolution is obtained in the entire region of the image circle. In other words, the infrared imaging lens 1 is a standard lens that is compatible with a far infrared camera to which a small-sized image sensor in a wavelength region of approximately 7 μm to 14 μm is applied.

As the above image sensor, an image sensor including 640×480 pixels (video graphics array (VGA)) and an image sensor including 640×512 pixels (VGA+) have been developed. These image sensors each have an effective diagonal length of approximately 9.8 mm. As such, an image circle of the infrared imaging lens 1 has a diameter φs of approximately equal to or more than 9.8 mm, which corresponds to the effective diagonal length. Thus, due to the above-described relationship between the diameter φs of the image circle and the focal length f, the focal length f of the infrared imaging lens 1 is in a range of 7.8 mm to 11.8 mm.

The infrared imaging lens 1 in accordance with the present embodiment is an infrared imaging lens including a plurality of lenses which are disposed in respective positions, the plurality of lenses each being made of the glass having a refractive index of 2.8 to 4.0 measured at a wavelength of 10 μm. As such, in the infrared imaging lens 1, at least one of the plurality of lenses can be an aspherical lens.

This makes it possible to provide a standard lens conventionally impossible to provide, specifically, a standard lens which can handle a wide wavelength range of 7 μm to 14 μm, which has an F-number as low as approximately one (1), and which is excellent in resolution. Particularly in terms of resolution, a standard lens having remarkably excellent properties, i.e., an MTF of not less than 0.17 at a spatial frequency of 41.7 cycles/mm in a wavelength range of 7 μm to 14 μm in the image circle, is provided. Further, it is possible to provide a standard lens exhibiting little light absorption by a glass material of the lenses over a wide wavelength range of at least 7 μm to 14 μm. This, combined with the low F-number of approximately one (1), makes it possible to provide a bright imaging lens.

Further, the infrared imaging lens 1 in accordance with the present embodiment can have an MTF of not less than 0.50 at a spatial frequency corresponding to ½ of the Nyquist frequency of 41.7 cycles/mm. This indicates that a good MTF is obtained not only at the spatial frequency corresponding to the Nyquist frequency but also over an entire range from a spatial frequency of 0 cycles/mm to the Nyquist frequency.

Further, the infrared imaging lens 1 in accordance with the present embodiment can have a relative illuminance on the image surface of not less than 40% in the image circle. This indicates that a satisfactory peripheral light quantity is secured.

<Details of Configuration of Each Lens>

Further, the infrared imaging lens 1 in accordance with the present embodiment can be configured to have details of each part as described below.

The first lens L1 has positive refractive power and has a meniscus shape having a convex surface which is oriented to the object side. The first lens L1 can be an aspherical lens. The first lens L1 has (i) an object-side surface (first surface) which is a spherical surface and (ii) an image surface S-side surface (second surface) which can be an aspherical surface. As described above, the effective diameter of the object-side surface (first surface) of the first lens L1 serves as the aperture of the infrared imaging lens 1. In this case, the subsequent lenses sequentially increase in size. This causes the infrared imaging lens 1 to have an increased outer diameter and an increased volume. As such, it is preferable that (i) the first lens L1 have a meniscus shape having a convex surface which is oriented to the object side and (ii) the following limitation is given to the power of the first lens L1.

The focal length f1 of the first lens L1 is in a range of 1.0 times to 2.9 times the focal length f of the infrared imaging lens 1. In other words, it is preferable that the following relational expression be satisfied:

$$1.0 \le f1/f \le 2.9.$$

This configuration makes it possible to reduce the outer diameter and the volume of the infrared imaging lens 1 in comparison to a case in which an aperture diaphragm is inserted between the lenses. Further, in a case where effective diameter of the object-side surface (first surface) of the first lens L1 serves as the aperture of the infrared imaging lens 1 and the above relational expression is satisfied, vignetting of peripheral light beams is reduced, so that peripheral light quantity is increased.

The second lens L2 has positive refractive power and has a meniscus shape having a convex surface which is oriented to the image surface S side. The second lens L2 is an aspherical lens and has (i) an object-side surface (third surface) which is an aspherical surface and (ii) an image surface S-side surface (fourth surface) which can be a diffractive surface.

The third lens L3 has positive refractive power and has a meniscus shape having a convex surface which is oriented to the image surface S side. The third lens L3 is an aspherical lens and has (i) an object-side surface (fifth surface) which is a spherical surface and (ii) an image surface S-side surface (sixth surface) which can be an aspherical surface.

Thus, the infrared imaging lens 1 includes the first lens L1, the second lens L2, and the third lens which are disposed in respective positions, and it is preferable that all of the first lens L1, the second lens L2, and the third lens have a positive refractive index. The infrared imaging lens 1 is preferably configured such that, in particular, the third lens L3 located closest to the image surface has a highest power.

Then, in a case where the second lens L2 and the third lens L3 both have a meniscus shape having a convex surface which is oriented to the image surface S side, it is possible to prevent or reduce an increase in Petzvar sum, prevent or reduce field curvature, and maintain planarity. Further, it is particularly preferable that the power of the third lens L3, the power of the first lens L1, and the power of the second lens L2 decrease in this order.

In a case where the infrared imaging lens 1 is configured such that (i) the third lens L3 located closest to the image surface has a highest power and (ii) the third lens L3 has a meniscus shape having a convex surface which is oriented to the image surface S side, astigmatism is reduced.

Further, as described above, it is preferable that at least one of the first lens L1, the second lens L2, and the third lens be an aspherical lens. This makes it possible to reduce spherical aberration and astigmatism of the infrared imaging lens 1. It is particularly preferable that each of the first lens L1, the second lens L2, and the third lens be an aspherical lens.

Further, it is preferable that the image surface S-side surface (fourth surface) of the second lens L2 or the object-side surface (fifth surface) of the third lens L3 be a diffractive surface. This makes it possible to generate negative dispersion and reduce transverse chromatic aberration.

Other Preferable Aspects

The infrared imaging lens 1 in accordance with the present embodiment preferably has an F-number in a range of 1.0 to 1.2, in order to achieve excellent resolution compatible with a pixel pitch approximately equivalent to a wavelength of approximately 7 μm to 14 μm, which is a wavelength handled by the infrared imaging lens 1. Causing the F-number to be in this range makes it possible to provide a bright standard lens which is used in an infrared region at a wavelength of approximately 7 μm to 14 μm.

The infrared imaging lens 1 in accordance with the present embodiment is preferably configured such that the third lens L3 has a focal length f3 which is approximately equal to the focal length f of the infrared imaging lens 1. Specifically, the focal length f3 is preferably in a range of 0.8 times to 1.2 times the focal length f. In other words, it is preferable that the following relational expression be satisfied:

$$0.8 \leq f3/f \leq 1.2.$$

The configuration which satisfies the relational expression makes it possible to obtain a good resolution over a large area in an image circle. In other words, it is possible to obtain a good resolution over the entire area of an image sensor in the class of a pixel pitch of approximately 12 μm and 640×480 pixels (VGA), 640×512 pixels (VGA+), or the like, which image sensor has a detection surface relatively large for an image sensor used in an infrared region at a wavelength of approximately 7 μm to 14 μm.

The focal length f3 of the third lens L3 being approximately equal to the focal length f of the infrared imaging lens 1 indicates that contributions of the first lens L1 and the second lens L2 to the focal length f of the entire system are very small. By employing a configuration in which (i) only the third lens L3 greatly contributes to the focal length f and (ii) the first lens L1 and the second lens L2 mainly contribute to aberration removal, it is possible to provide an infrared imaging lens which can achieve a good resolution over the entire area of such a large detection surface.

More preferably, the focal length f3 of the third lens L3 is in a range of 0.9 times to 1.2 times the focal length f of the infrared imaging lens. In other words, it is more preferable that the first lens L1, the second lens L2, and the third lens L3 be configured to satisfy the following relational expression:

$$0.9 \leq f3/f \leq 1.2.$$

Further, the infrared imaging lens 1 in accordance with the present embodiment has a total lens length L which is preferably within a range of 1.0 times to 2.5 times the focal length f of the infrared imaging lens. In other words, it is preferable that the following relational expression be satisfied:

$$1.0 \leq L/f \leq 2.5.$$

Note here that the total lens length is an actual distance, as measured along the optical axis, between (i) an object-side end of a lens that is closest to the object, the object-side end being within the effective diameter of the lens and (ii) the image surface S.

More preferably, the total lens length L of the infrared imaging lens is in a range of 1.1 times to 2.3 times the focal length f of the infrared imaging lens. In other words, it is more preferable that the first lens L1, the second lens L2, and the third lens L3 be configured to satisfy the following relational expression:

$$1.1 \leq L/f \leq 2.3.$$

This configuration makes it possible to provide a compact standard lens.

Thus, a configuration is employed in which the total lens length L is not too greater than the focal length f, while the focal length f3 of the third lens L3 is approximately equal to the focal length f of the infrared imaging lens 1. The configuration makes it possible to provide an infrared imaging lens which is a standard lens and is excellent in various properties such as aberration properties, resolution, and peripheral light quantity while being compact.

In the infrared imaging lens 1 in accordance with the present embodiment, it is preferable that a back focus BF be not less than 0.5 times the focal length f of the infrared imaging lens 1. In other words, it is preferable that the following relational expression be satisfied:

$$0.5 \leq BF/f.$$

The back focus BF is more preferably not less than 0.65 times the focal length f of the infrared imaging lens 1. In other words, it is more preferable that the first lens L1, the second lens L2, and the third lens L3 be configured to satisfy the following relational expression:

$$0.65 \leq BF/f.$$

This configuration makes it possible to provide a standard lens in which a sufficient back focus is secured and which is compact.

The infrared imaging lens 1 in accordance with the present embodiment is preferably configured such that the focal length of the infrared imaging lens is specifically in a range of 7 mm to 12 mm. This configuration makes it possible to provide an infrared imaging lens which is a standard lens and is compact and widely available for commercial use while being excellent in various properties such as aberration properties, resolution, and peripheral light quantity.

Further, the infrared imaging lens 1 in accordance with the present embodiment is preferably configured such that the total lens length of the infrared imaging lens is specifically not more than 30 mm. This configuration makes it possible to provide an infrared imaging lens which is a standard lens and is compact and widely available for commercial use while being excellent in various properties such as aberration properties, resolution, and peripheral light quantity.

<Configuration of Infrared Camera>

An infrared camera of the present disclosure includes the infrared imaging lens 1 described above and an image sensor which can handle an infrared region including at least a wavelength in a range of 7 μm to 14 μm. The image sensor is disposed such that the imaging surface is located at the position of the image surface S of the infrared imaging lens 1.

In order to have a performance capability compatible with the resolution of the infrared imaging lens 1, the image sensor preferably has a pixel pitch of 7 μm to 14 μm, which is approximately equivalent to a wavelength of infrared radiation. In particular, the pixel pitch is preferably 9 μm to 12 μm. It is preferable that the image sensor have a diagonal length of 7 mm to 11 mm in order to efficiently use the image circle diameter φs of the infrared imaging lens 1. Needless to say, however, the image sensor included in the infrared camera of the present disclosure can be an image sensor having a diagonal length smaller than the above diagonal length.

Numerical Example 1

The following description will discuss a numerical example of the infrared imaging lens 1. A cross-sectional view of the infrared imaging lens in accordance with Numerical Example 1 is as illustrated in FIG. 1. In Numerical Example 1, r represents a radius of curvature, d represents an inter-surface distance on the optical axis, and ED represents an effective diameter (diameter). The unit of length is (mm). The symbol "*" (asterisk) following a number of the surface number represents an aspherical surface. Basic lens data, aspherical surface data, diffractive surface data, and various data are shown below.

TABLE 1

| Numerical Example 1 Basic lens data | | | | | |
| --- | --- | --- | --- | --- | --- |
| Surface number | r (mm) | d (mm) | N10 | V10 | ED (mm) |
| Object surface | | ∞ | | | |
| 1 | 12.77927 | 3.90000 | 3.46501 | 253 | 9.011 |
| 2* | 12.71081 | 1.72148 | | | 8.006 |
| 3* | −27.04478 | 3.65000 | 3.46501 | 253 | 8.238 |
| 4* (Diffractive surface) | −22.98231 | 1.19971 | | | 11.324 |
| 5 | −15.06204 | 3.50000 | 3.46501 | 253 | 12.510 |

TABLE 1-continued

| Numerical Example 1 Basic lens data | | | | | |
| --- | --- | --- | --- | --- | --- |
| Surface number | r (mm) | d (mm) | N10 | V10 | ED (mm) |
| 6* | −10.87695 | 5.82053 #1 | | | 14.768 |
| 7 | ∞ | 0.63000 | 3.41776 | 3129 | 11.525 |
| 8 | ∞ | 0.50000 | | | 11.432 |
| Image surface | | | | | |

1 Variable by focusing

A refractive index and an Abbe number V10 are as defined below.

N8: a refractive index measured at a wavelength of 8 μm
N10: a refractive index measured at a wavelength of 10 μm
N12: a refractive index measured at a wavelength of 12 μm
V10=(N10−1)/(N8−N12)

TABLE 2

| Numerical Example 1 Aspherical surface data | | | | |
| --- | --- | --- | --- | --- |
| Coefficient | Second surface | Third surface | Fourth surface | Sixth surface |
| K | 0.0000000E+00 | 0.0000000E+00 | 0.0000000E+00 | 0.0000000E+00 |
| A2 | 0.0000000E+00 | 0.0000000E+00 | 0.0000000E+00 | 0.0000000E+00 |
| A4 | −1.5359185E−05 | −5.0014179E−04 | 0.0000000E+00 | 2.4998352E−05 |
| A6 | −4.8381278E−06 | −1.3533520E−05 | 0.0000000E+00 | −1.3907450E−06 |
| A8 | −6.4632990E−09 | −1.9123885E−07 | 0.0000000E+00 | 1.4303773E−08 |
| A10 | −6.8432841E−09 | −3.2750134E−08 | 0.0000000E+00 | −1.3309061E−10 |

An aspherical shape is as defined below.

$$Z = \frac{h^2/r}{1 + \sqrt{1 - (1 + \kappa)(h/r)^2}} + \sum A_h h^n$$

h: Height from optical axis r: Vertex radius of curvature k: Conic constant

An: n-th aspherical surface coefficient (n is an even number)

Z: Distance at h from point on aspherical surface to tangential plane of aspherical surface vertex

TABLE 3

| Numerical Example 1 Diffractive surface data | |
| --- | --- |
| Coefficient | Fourth surface |
| P1 | −6.4818464E−01 |
| P2 | −3.8289591E−04 |

A diffractive surface is as defined below.

$$\Phi = P_1 \times h^2 + P_2 \times h^4$$

$$Z_{dif} = \frac{\lambda}{2\pi}\Phi$$

$$Z_{DOE} = \frac{1}{(N-1)} \times MOD\ (Z_{dif}, -\lambda)$$

$\Phi$: Phase difference function $P_1$, $P_2$: Phase coefficient $Z_{dif}$: Optical path function $Z_{DOE}$: Sag amount of diffractive surface $\lambda$: Design center wavelength (assumed to be 10 μm)

TABLE 4

Numerical Example 1 Various data

| | |
|---|---|
| Position of aperture diaphragm: | Corresponding to first surface. |
| | Aperture diameter $\Phi$: 9.011 mm |
| F-number: | 1.0 |
| Maximum half angle of view: | 29.8° |
| Maximum image height: | 4.92 mm |
| Entire system focal length: | 9.011 mm |
| Back focus: | 6.9505 mm (d6 + d7 + d8) |
| Total lens length: | 20.9217 mm |

The first lens L1, the second lens L2, and the third lens L3 are each made of chalcogenide glass having a refractive index N10 of 3.465 measured at a wavelength of 10 μm. The parallel flat plate P is made of silicon (Si). The image surface S-side surface (fourth surface) of the second lens L2 is a diffractive surface obtained by forming a sag on a spherical surface. The sag has a depth in a range corresponding to 0 to the design center wavelength A (see the definitional equation of $Z_{DOE}$). The back focus of 6.95 mm is an actual distance.

The first lens L1 has a focal length f1 of 24.35 mm. Thus, a ratio of the focal length f1 to the focal length f of the infrared imaging lens 1 is as follows.

$$f1/f=2.7$$

The second lens L2 has a focal length f2 of 37.87 mm. The third lens L3 has a focal length f3 of 9.96 mm. Thus, the third lens L3 and the first lens L1 have the highest power and the second highest power, respectively.

A maximum image height on the image surface S is 4.92 mm. As such, the image circle has a diameter φs of 9.84 mm. A ratio of the diameter φs of the image circle of the infrared imaging lens 1 to the focal length f of the infrared imaging lens 1 is as follows.

$$\varphi s/f=1.09$$

That is, the infrared imaging lens 1 is a standard lens. Further, the infrared imaging lens 1 has a half angle of view of 29.8°. This is within a range of 21° to 36°, within which the infrared imaging lens 1 can be regarded as a standard lens.

The infrared imaging lens 1 is as compact as having (i) a total length of 20.9 mm as measured from the first surface to the image surface and (ii) a maximum effective diameter on an optical path of 14.8 mm. Further, the infrared imaging lens 1 has a triple-lens configuration and can be made lightweight. Combined with the fact that each lens can be press-molded, the infrared imaging lens 1 can be produced at a low cost that allows the infrared imaging lens 1 to be applied to a commercial use.

Figure 3:
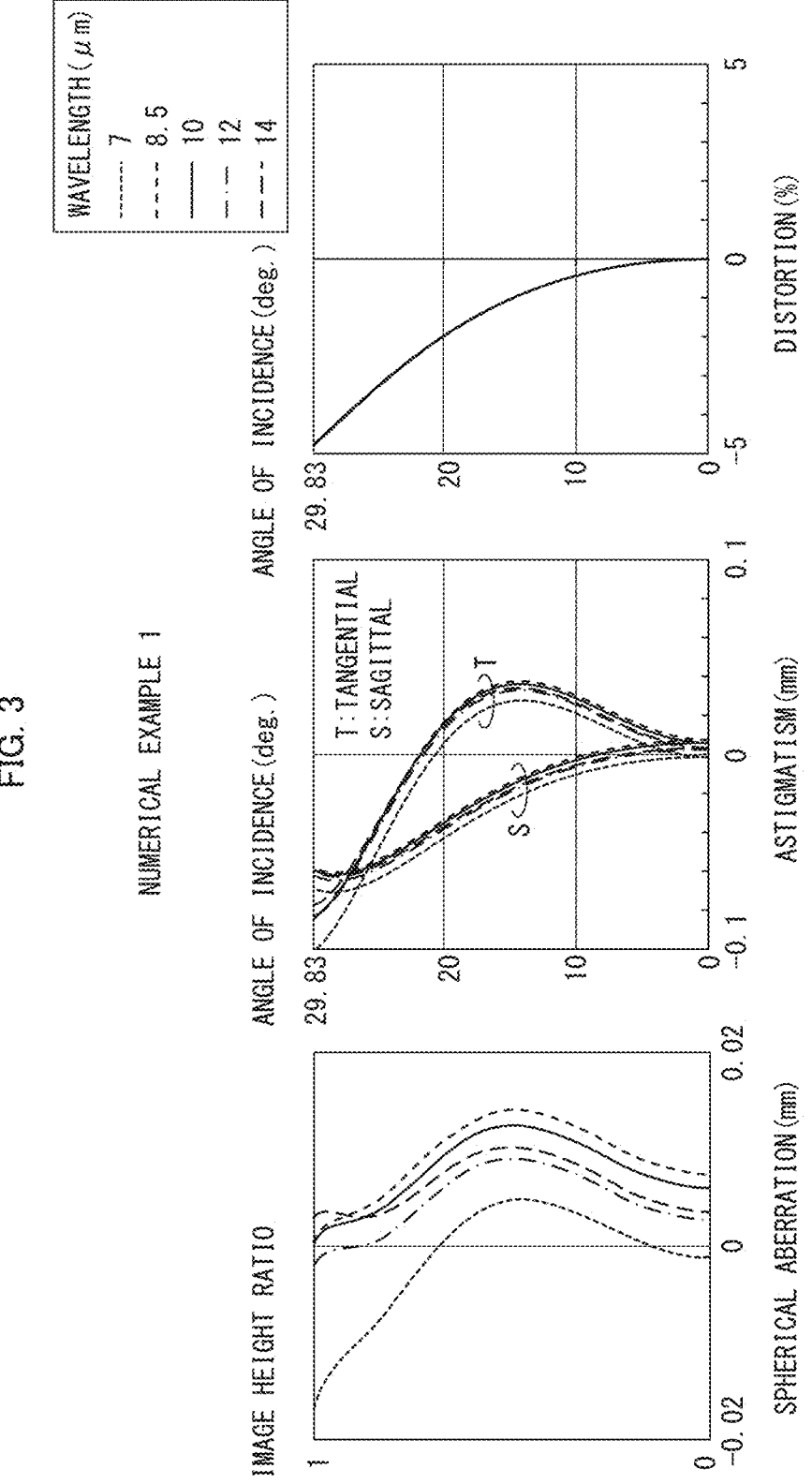
FIG. 3 is an aberration diagram illustrating spherical aberration, astigmatism, and distortion of an infrared imaging lens in accordance with Numerical Example 1 of the present invention.
Figure 4:
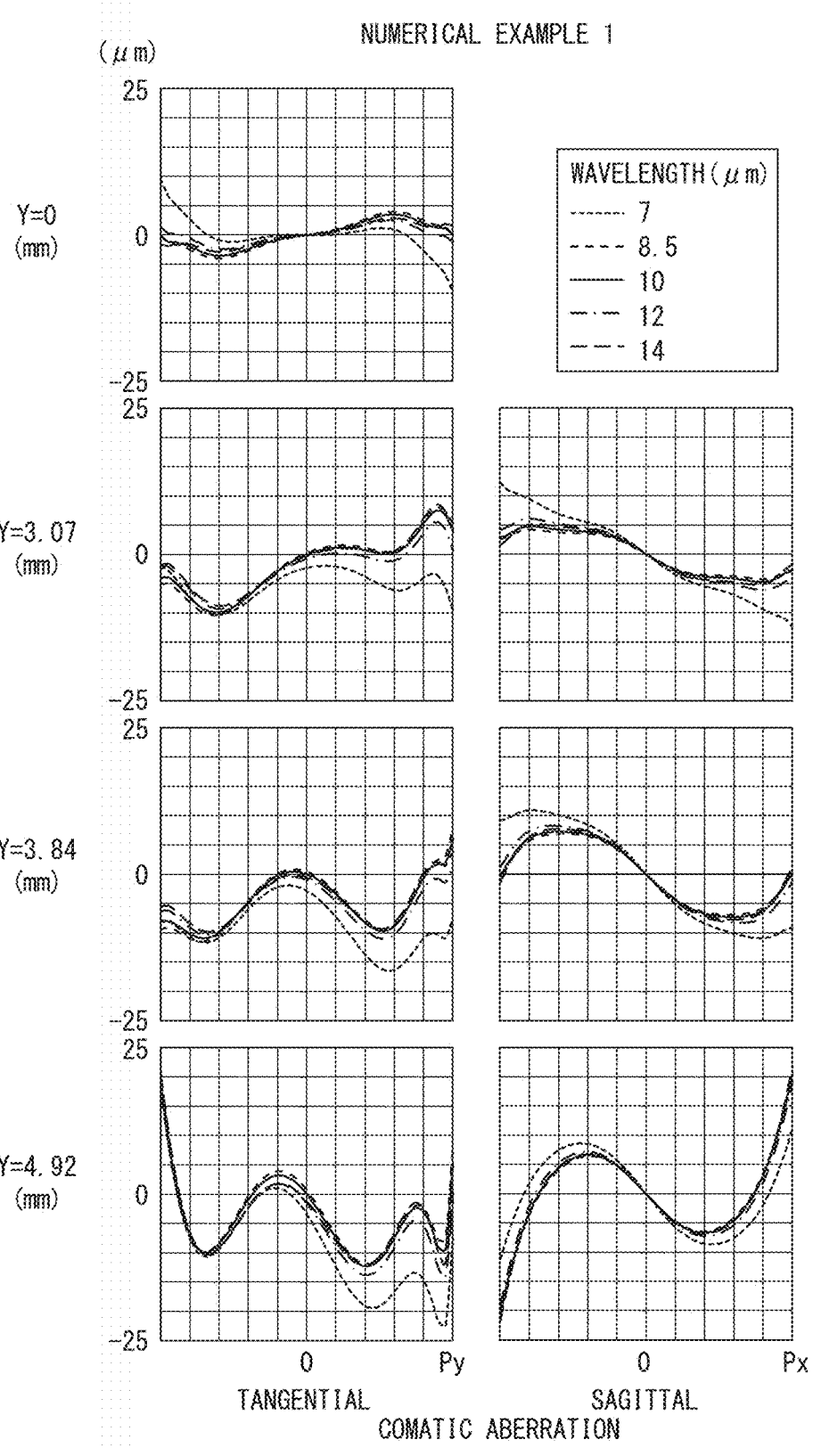
FIG. 4 is an aberration diagram illustrating comatic aberration of the infrared imaging lens in accordance with Numerical Example 1 of the present invention.

Various performance capabilities of the infrared imaging lens 1 of Numerical Example 1 are illustrated in FIGS. 3 to 7. FIG. 3 is an aberration diagram of the infrared imaging lens 1. FIG. 3 illustrates spherical aberration, astigmatism, and distortion. For each of spherical aberration, astigmatism, and distortion, graphs corresponding to respective wavelengths ranging from 7 μm to 14 μm are shown. FIG. 4 is an aberration diagram illustrating comatic aberration at each image height Y ranging from 0 mm up to a maximum image height of 4.92 mm, for each of a tangential (meridional)

direction and a sagittal (radial) direction. As illustrated in FIGS. 3 and 4, the infrared imaging lens 1 in accordance with Numerical Example 1 has various types of aberration satisfactorily corrected over a wide wavelength region of 7 μm to 14 μm.

Figure 5:
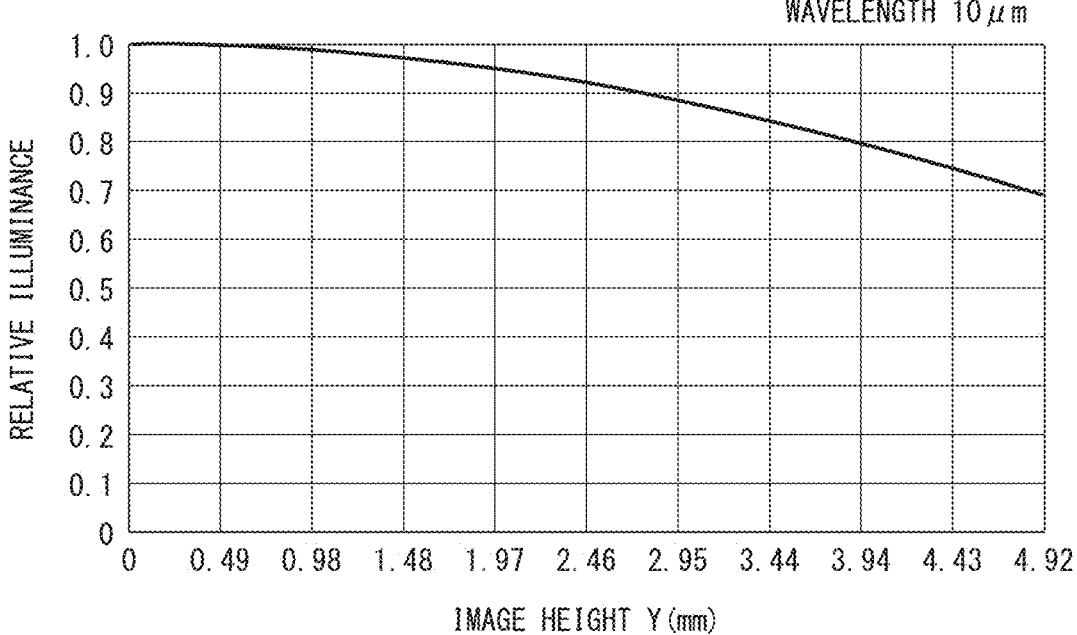
FIG. 5 is a graph showing image height dependence of a relative illuminance of the infrared imaging lens in accordance with Numerical Example 1 of the present invention.

FIG. 5 is a graph showing a relative illuminance with respect to an image height Y of the infrared imaging lens 1 in accordance with Numerical Example 1. Note here that the relative illuminance refers to an illuminance ratio of a certain region to an on-optical axis region (image surface central region) on the image surface S. As illustrated in FIG. 5, even at a maximum image height of 4.92 mm, a satisfactory peripheral light quantity as much as a relative illuminance of 0.68 is obtained.

In a case where an image sensor having a 640×512 pixels (VGA+) and an effective diagonal length of 9.84 mm is used, an image height Y corresponding to a center of right and left ends of an imaging surface is 3.84 mm, and a relative illuminance at that image height is 0.80. Further, in this case, an image height Y corresponding to a center of upper and lower ends of the imaging surface is 3.07 mm, and a relative illuminance at that image height is 0.87.

Figure 6:
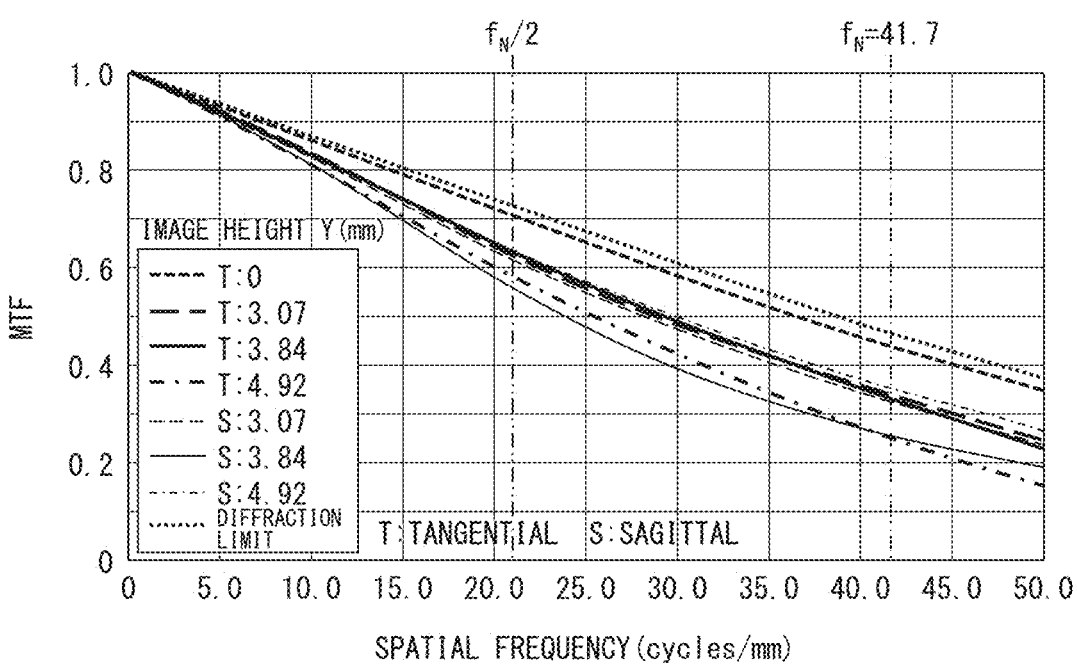
FIG. 6 is a graph showing spatial frequency dependence of an MTF of the infrared imaging lens in accordance with Numerical Example 1 of the present invention.

FIG. 6 is a graph showing spatial frequency dependence of an MTF in a wavelength range of 7 μm to 14 μm. As described above, an image sensor having a pixel pitch of 12 μm has a Nyquist frequency $f_N$ of 41.7 cycles/mm, which is shown in FIG. 6. A half value $f_N/2$ thereof (20.85 cycles/mm) is also shown in FIG. 6.

At the spatial frequency of 41.7 cycles/mm, an MTF of not less than 0.24, which is sufficiently higher than 0.17, is secured at each image height Y. At this time, at an image height Y of 0 mm, that is, at a center of the image, a good resolution as high as an MTF of 0.43 is exhibited. At the spatial frequency of 20.85 cycles/mm, an MTF of not less than 0.56, which is sufficiently higher than 0.50, is secured at each image height Y. The infrared imaging lens 1 in accordance with Numerical Example 1 exhibits, over the entire area of the image circle, a good resolution suited to an image sensor having a narrow pixel pitch approximately equivalent to a wavelength.

Figure 7:
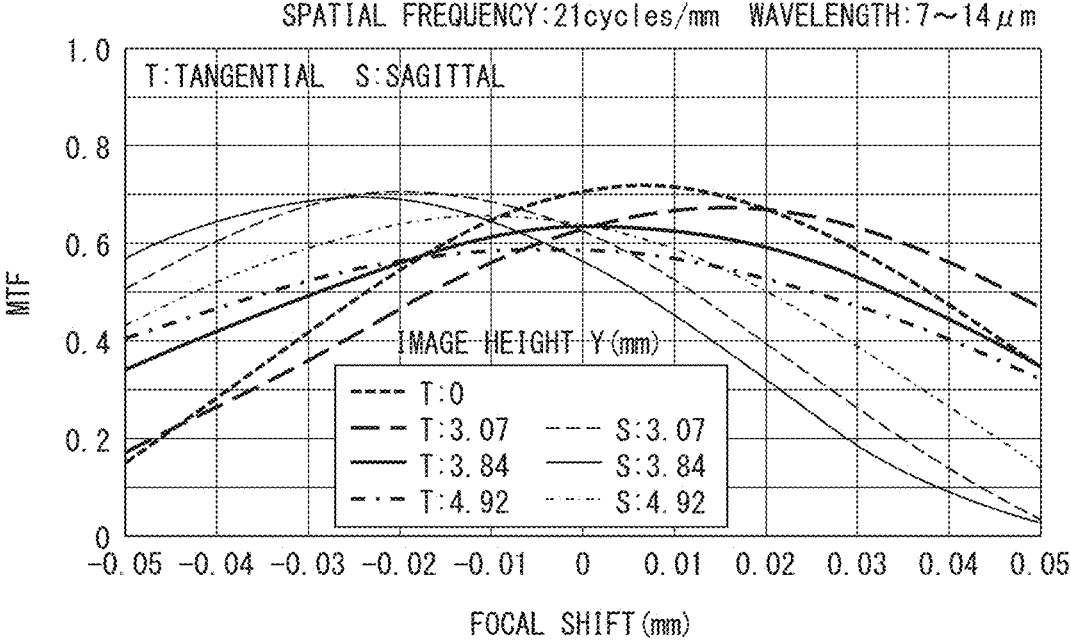
FIG. 7 is a graph showing focal shift dependence of an MTF of the infrared imaging lens in accordance with Numerical Example 1 of the present invention.

FIG. 7 is a graph showing a change, with respect to a focal shift, in MTF in a wavelength range of 7 μm to 14 μm. As described above, the infrared imaging lens 1 in accordance with Numerical Example 1 can cover a wavelength range of 7 μm to 14 μm and has a good resolution sufficiently suited to an image sensor having a pixel pitch of approximately 12 μm. Further, the infrared imaging lens 1 in accordance with Numerical Example 1 is as bright as having an F-number of 1.0, and is compact. The present embodiment thus makes it possible to provide an infrared imaging lens which, unlike conventional infrared imaging lenses, is compact and has excellent properties.

In Numerical Example 1, a ratio of the focal length f3 of the third lens L3 to the focal length f of the infrared imaging lens is as follows.

$$f3/f=1.1$$

The focal length f3 of the third lens L3 is thus set approximately equal to the focal length f of the infrared imaging lens.

In Numerical Example 1, a ratio of the total lens length L of the infrared imaging lens to the focal length f of the infrared imaging lens is as follows.

$$L/f=2.3$$

The infrared imaging lens is thus configured such that the total lens length L is not too greater than the focal length f.

In Numerical Example 1, a ratio of the back focus BF to the focal length f of the infrared imaging lens is as follows.

$$BF/f=0.77$$

Thus, a sufficient back focus is secured.

Numerical Example 2

Figure 8:
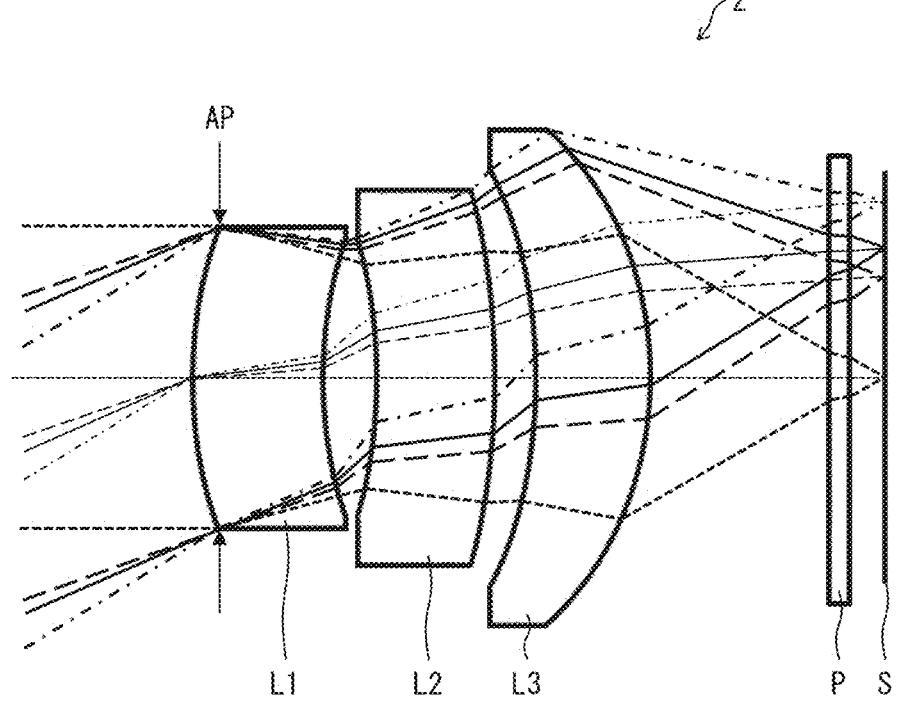
FIG. 8 is an optical path diagram of an infrared imaging lens in accordance with Numerical Example 2 of the present invention.

The following description will discuss another numerical example of the infrared imaging lens. For convenience of explanation, the same reference numerals will be given to members having the same functions as the members described in the above examples and the description will not be repeated. A cross-section of an infrared imaging lens 2 in accordance with Numerical Example 2 is illustrated in an optical path diagram of FIG. 8.

The infrared imaging lens 2 in accordance with Numerical Example 2 is an imaging lens which is optimized to satisfactorily form an image of infrared radiation in a wavelength range of 7.5 μm to 13.5 μm and which has an F-number of 1.0. The infrared imaging lens 2 has a design center wavelength of 10 μm. Basic lens data, aspherical surface data, diffractive surface data, and various data are shown below.

TABLE 5

Numerical Example 2 Basic lens data

| Surface number | r (mm) | d (mm) | N10 | V10 | ED (mm) |
|---|---|---|---|---|---|
| Object surface | | ∞ | | | |
| 1 | 12.54323 | 3.90000 | 3.46501 | 253 | 9.010 |
| 2* | 12.31696 | 1.62416 | | | 7.965 |
| 3* | −27.34873 | 3.50932 | 3.46501 | 253 | 8.121 |
| 4 | −23.25500 | 1.22385 | | | 11.079 |
| 5* (Diffractive surface) | −14.76878 | 3.40454 | 3.46501 | 253 | 12.334 |
| 6* | −10.70036 | 5.85249 #1 | | | 14.533 |
| 7 | ∞ | 0.63000 | 3.41776 | 3129 | 11.110 |
| 8 | ∞ | 0.50000 | | | 11.022 |
| Image surface | | | | | 9.893 |

1 Variable by focusing

TABLE 6

Numerical Example 2 Aspherical surface data

| Coefficient | Second surface | Third surface | Fifth surface | Sixth surface |
|---|---|---|---|---|
| K | 0.0000000E+00 | 0.0000000E+00 | 0.0000000E+00 | 0.0000000E+00 |
| A2 | 0.0000000E+00 | 0.0000000E+00 | 0.0000000E+00 | 0.0000000E+00 |
| A4 | 7.8075520E−06 | −5.0365522E−04 | 0.0000000E+00 | 1.9784940E−05 |
| A6 | −1.09755495E−05 | −1.8917989E−05 | 0.0000000E+00 | −1.3049319E−06 |
| A8 | 4.4633727E−07 | 1.9266483E−07 | 0.0000000E+00 | 1.0457411E−08 |
| A10 | −2.4232467E−08 | −5.4098741E−08 | 0.0000000E+00 | −1.1278416E−10 |

TABLE 7

Numerical Example 2 Diffractive surface data

| Coefficient | Fifth surface |
|---|---|
| P1 | −6.0201136E−01 |
| P2 | 5.1361241E−04 |

TABLE 8

Numerical Example 2 Various data

| | |
|---|---|
| Position of aperture diaphragm: | Corresponding to first surface. Aperture diameter Φ: 9.01 mm |
| F-number: | 1.0 |
| Maximum half angle of view: | 29.9° |
| Maximum image height: | 4.92 mm |
| Entire system focal length: | 9.01 mm |
| Back focus: | 6.98 mm (d6 + d7 + d8) |
| Total lens length: | 20.64 mm |

The first lens L1, the second lens L2, and the third lens L3 are each made of chalcogenide glass having a refractive index N10 of 3.465 measured at a wavelength of 10 μm. The parallel flat plate P is made of silicon (Si). The object-side surface (fifth surface) of the third lens L3 is a diffractive surface obtained by forming a sag on a spherical surface. The sag has a depth in a range corresponding to 0 to a design center wavelength (see the definitional equation of $Z_{DOE}$). The back focus of 6.98 mm is an actual distance.

The first lens L1 has a focal length f1 of 24.60 mm. Thus, a ratio of the focal length f1 to the focal length f of the infrared imaging lens 2 is as follows.

$$f1/f=2.7$$

The second lens L2 has a focal length f2 of 39.15 mm. The third lens L3 has a focal length f3 of 9.88 mm. Thus, the third lens L3 and the first lens L1 have the highest power and the second highest power, respectively. A ratio of the focal length f3 of the third lens L3 to the focal length f of the infrared imaging lens is as follows.

$$f3/f=1.1$$

The focal length f3 of the third lens L3 is set approximately equal to the focal length f of the infrared imaging lens.

A maximum image height on the image surface S is 4.92 mm. As such, the image circle has a diameter φs of 9.84 mm. A ratio of the diameter φs of the image circle of the infrared imaging lens 2 to the focal length f of the infrared imaging lens 2 is as follows.

$$φs/f=1.09$$

That is, the infrared imaging lens 2 is a standard lens. Further, the infrared imaging lens 2 has a half angle of view of 29.9°. This is within a range of 21° to 36°, within which the infrared imaging lens 2 can be regarded as a standard lens.

The infrared imaging lens 2 is as compact as having (i) a total lens length L of 20.6 mm as measured from the first surface to the image surface and (ii) a maximum effective diameter on an optical path of 14.5 mm. A ratio of the total lens length L of the infrared imaging lens to the focal length f of the infrared imaging lens is as follows.

$$L/f=2.3$$

The infrared imaging lens is thus configured such that the total lens length L is not too greater than the focal length f.

Further, the infrared imaging lens 2 has a triple-lens configuration and can be made lightweight. Combined with the fact that each lens can be press-molded, the infrared imaging lens 2 can be produced at a low cost that allows the infrared imaging lens 2 to be applied to a commercial use.

In Numerical Example 2, a ratio of the back focus BF to the focal length f of the infrared imaging lens is as follows.

$$BF/f=0.77$$

Thus, a sufficient back focus is secured.

Figure 9:
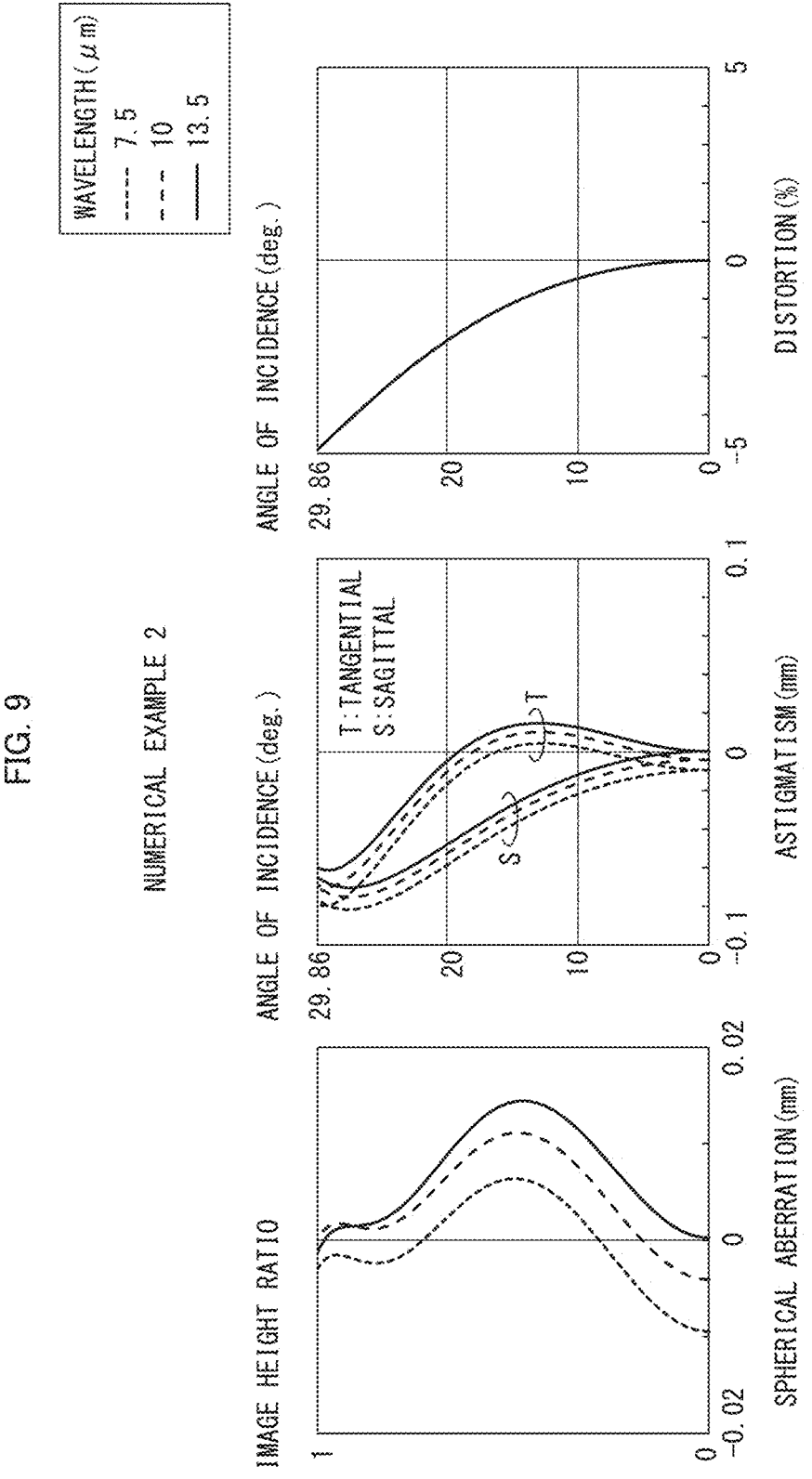
FIG. 9 is an aberration diagram illustrating spherical aberration, astigmatism, and distortion of the infrared imaging lens in accordance with Numerical Example 2 of the present invention.
Figure 10:
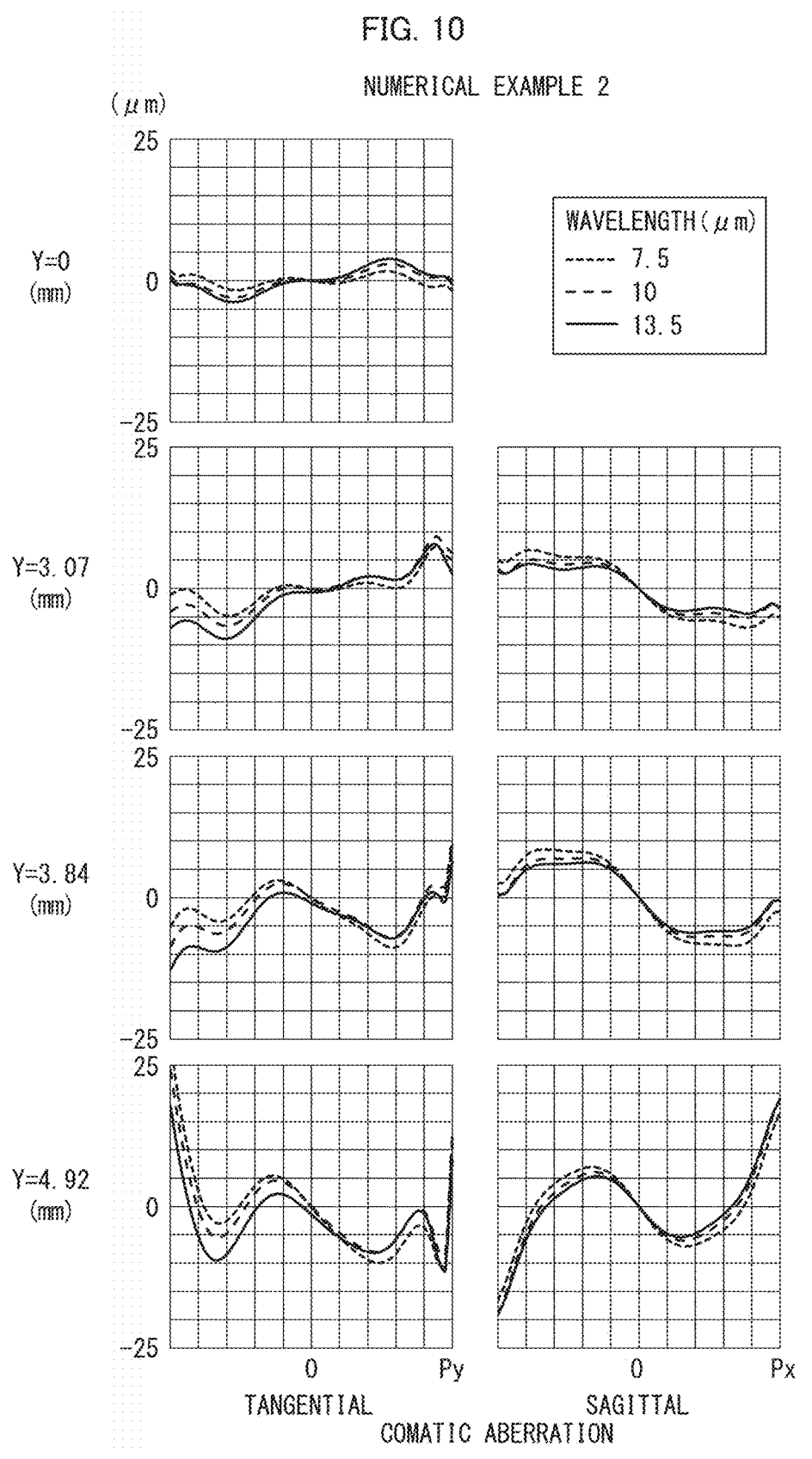

Various performance capabilities of the infrared imaging lens 2 of Numerical Example 2 are illustrated in FIGS. 9 to 13. FIG. 9 is an aberration diagram of the infrared imaging lens 2. FIG. 9 illustrates spherical aberration, astigmatism, and distortion. For each, graphs corresponding to respective wavelengths ranging from 7.5 μm to 13.5 μm are shown. FIG. 10 is an aberration diagram illustrating comatic aberration at each image height Y ranging from 0 mm up to a maximum image height of 4.92 mm, for each of a tangential (meridional) direction and a sagittal (radial) direction. As illustrated in FIGS. 9 and 10, the infrared imaging lens 2 in accordance with Numerical Example 2 has various types of aberration satisfactorily corrected over a wide wavelength region of 7.5 μm to 13.5 μm.

Figure 11:
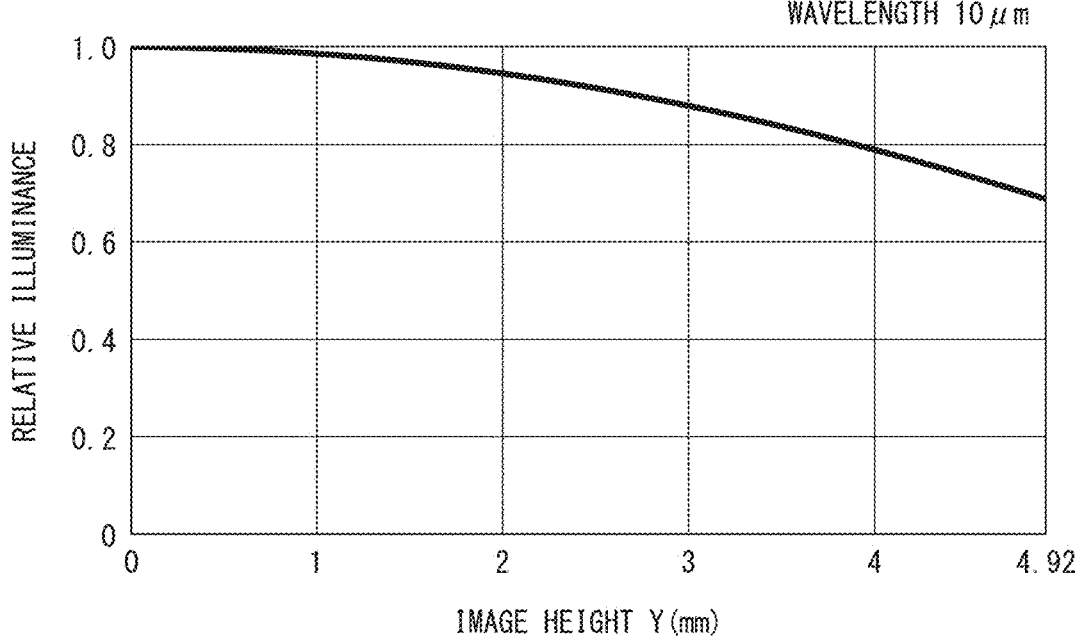
FIG. 11 is a graph showing image height dependence of a relative illuminance of the infrared imaging lens in accordance with Numerical Example 2 of the present invention.

FIG. 11 is a graph showing a relative illuminance with respect to an image height Y of the infrared imaging lens 2 in accordance with Numerical Example 2. As illustrated in FIG. 11, even at a maximum image height of 4.92 mm, a satisfactory peripheral light quantity as much as a relative illuminance of 0.69 is obtained.

In a case where an image sensor having a 640×512 pixels (VGA+) and an effective diagonal length of 9.84 mm is used, an image height Y corresponding to a center of right and left ends of an imaging surface is 3.84 mm, and a relative illuminance at that image height is 0.81. Further, in this case, an image height Y corresponding to a center of upper and lower ends of the imaging surface is 3.07 mm, and a relative illuminance at that image height is 0.87.

Figure 12:
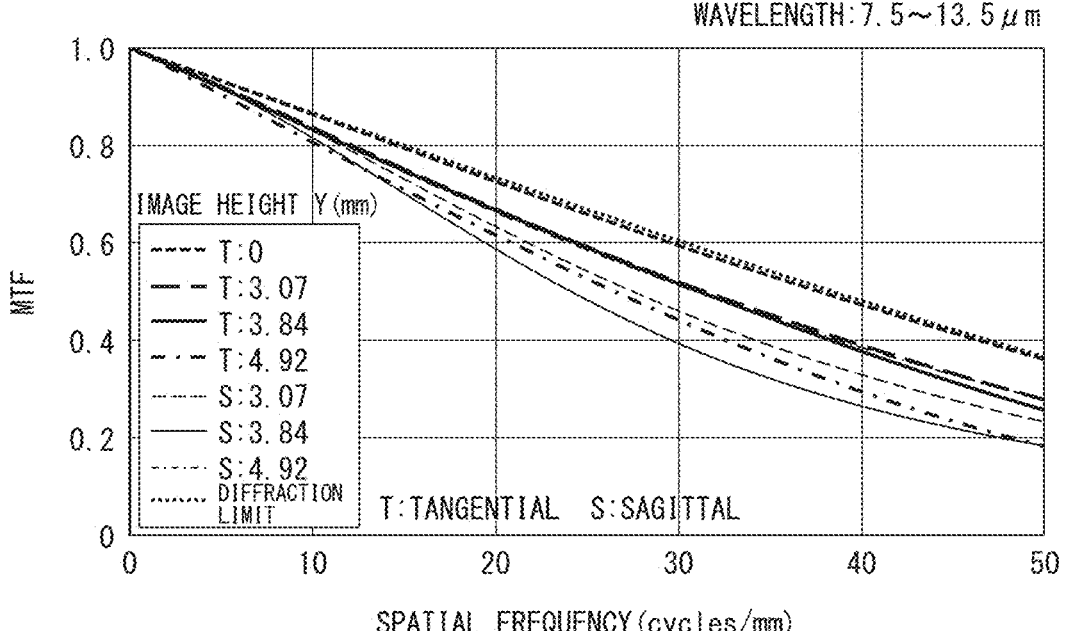
FIG. 12 is a graph showing spatial frequency dependence of an MTF of the infrared imaging lens in accordance with Numerical Example 2 of the present invention.

FIG. 12 is a graph showing spatial frequency dependence of an MTF in a wavelength range of 7.5 μm to 13.5 μm. At a spatial frequency of 41.7 cycles/mm corresponding to a pixel pitch of 12 μm, an MTF of not less than 0.30, which is sufficiently higher than 0.17, is secured at each image height Y in terms of a simple average of an MTF in the tangential direction and an MTF in the sagittal direction. At entire area of the image circle, a good resolution suited to an image sensor having a narrow pixel pitch approximately equivalent to a wavelength.

Figure 13:
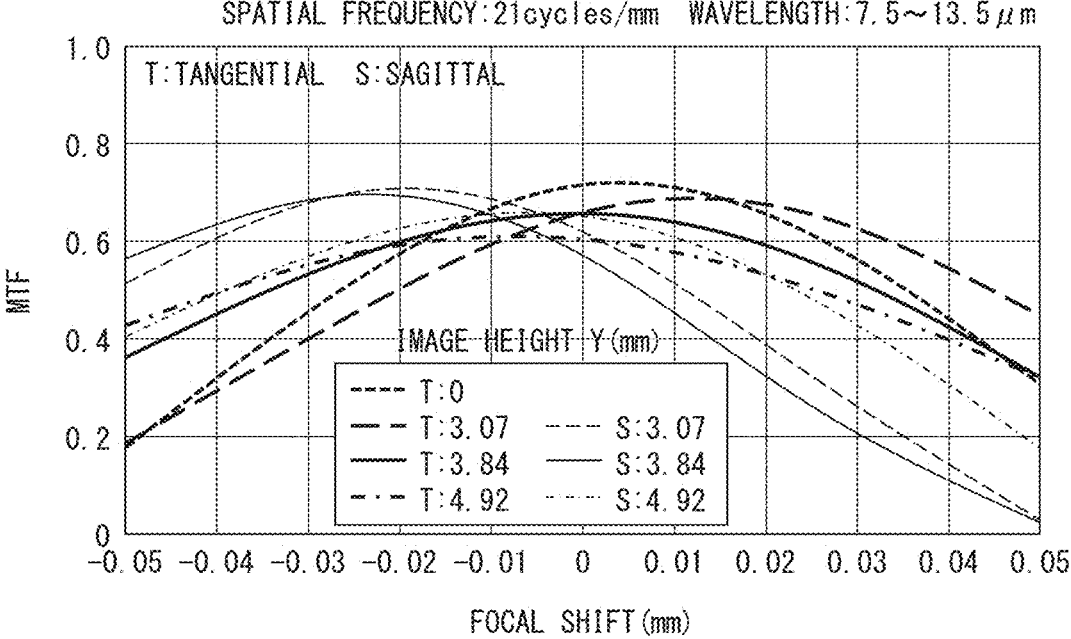
FIG. 13 is a graph showing focal shift dependence of an MTF of the infrared imaging lens in accordance with Numerical Example 2 of the present invention.

FIG. 13 is a graph showing a change, with respect to a focal shift, in MTF in a wavelength range of 7.5 μm to 13.5 μm. As described above, the infrared imaging lens 2 in accordance with Numerical Example 2 can cover a wavelength range of 7.5 μm to 13.5 μm and has a good resolution sufficiently suited to an image sensor having a pixel pitch of approximately 12 μm. Further, the infrared imaging lens 2 in accordance with Numerical Example 2 is as bright as having an F-number of 1.0, and is compact. Numerical Example 2 thus makes it possible to provide an infrared imaging lens which, unlike conventional infrared imaging lenses, is compact and has excellent properties.

Numerical Example 3

Figure 14:
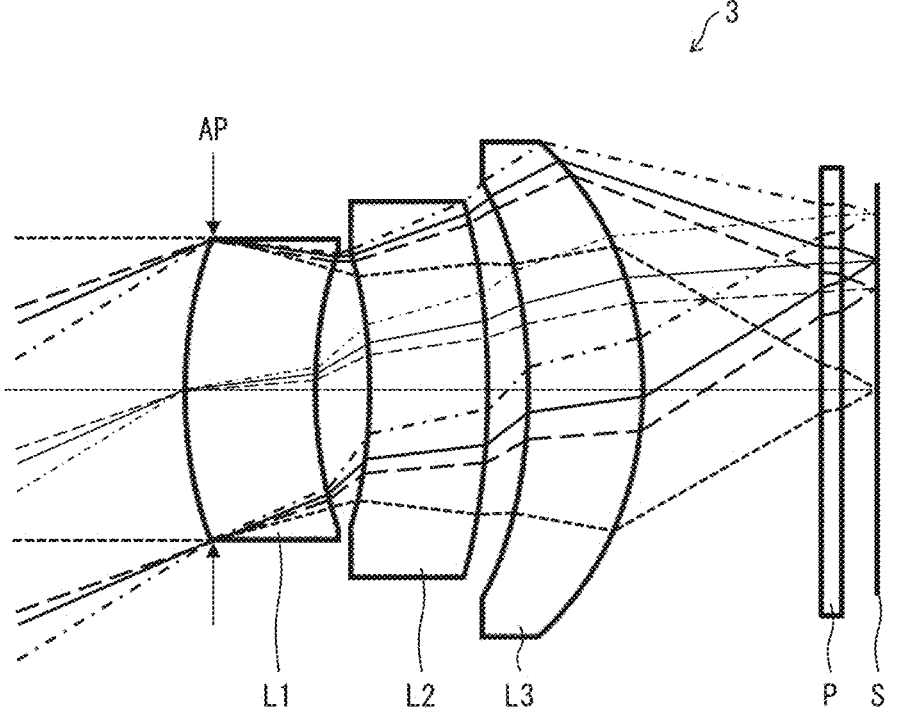
FIG. 14 is an optical path diagram of an infrared imaging lens in accordance with Numerical Example 3 of the present invention.

A cross-section of the infrared imaging lens 3 in accordance with Numerical Example 3 is illustrated in an optical path diagram of FIG. 14. The infrared imaging lens 3 in accordance with Numerical Example 3 is an imaging lens which is optimized to satisfactorily form an image of infrared radiation in a wavelength range of 7 μm to 14 μm and which has an F-number of 1.2. The infrared imaging lens 3 has a design center wavelength of 10 μm. Basic lens data, aspherical surface data, diffractive surface data, and various data are shown below.

TABLE 9

Numerical Example 3 Basic lens data

| Surface number | r (mm) | d (mm) | N10 | V10 | ED (mm) |
|---|---|---|---|---|---|
| Object surface | | ∞ | | | |
| 1 | 12.58944 | 3.90000 | 3.46501 | 253 | 9.010 |
| 2* | 12.44559 | 1.51240 | | | 7.965 |
| 3* | −26.31964 | 3.42200 | 3.46501 | 253 | 8.121 |
| 4 | −23.18400 | 1.23672 | | | 11.079 |
| 5* (Diffractive surface) | −14.44552 | 3.48261 | 3.46501 | 253 | 12.334 |
| 6* | −10.57879 | 5.94990 #1 | | | 14.533 |
| 7 | ∞ | 0.63000 | 3.41776 | 3129 | 11.210 |
| 8 | ∞ | 0.50000 | | | 11.122 |
| Image surface | | | | | 9.893 |

1 Variable by focusing

TABLE 10

Numerical Example 3 Aspherical surface data

| Coefficient | Second surface | Third surface | Fifth surface | Sixth surface |
|---|---|---|---|---|
| K | 0.0000000E+00 | 0.0000000E+00 | 0.0000000E+00 | 0.0000000E+00 |
| A2 | 0.0000000E+00 | 0.0000000E+00 | 0.0000000E+00 | 0.0000000E+00 |
| A4 | −2.6458828E−05 | −5.2511063E−04 | 0.0000000E+00 | 2.0618832E−05 |
| A6 | −9.7898605E−06 | −2.1389993E−05 | 0.0000000E+00 | −1.2607664E−06 |
| A8 | 2.6499652E−07 | 1.5720631E−07 | 0.0000000E+00 | 1.0406458E−08 |
| A10 | −2.1082302E−08 | −5.3920974E−08 | 0.0000000E+00 | −9.4385126E−11 | this time, at an image height Y of 0 mm, that is, at a center of the image, a good resolution as high as an MTF of 0.45 is exhibited.

Further, at a spatial frequency of 20.85 cycles/mm, an MTF of not less than 0.60, which is sufficiently higher than 0.50, is secured at each image height Y in terms of a simple average of an MTF in the tangential direction and an MTF in the sagittal direction. The infrared imaging lens 2 in accordance with Numerical Example 2 exhibits, over the

TABLE 11

Numerical Example 3 Diffractive surface data

| Coefficient | Fifth surface |
|---|---|
| P1 | −6.1617880E−01 |
| P2 | 6.1002647E−04 |

TABLE 12

| Numerical Example 3 Various data | |
|---|---|
| Position of aperture diaphragm: | Corresponding to first surface.<br>Aperture diameter Φ: 9.01 mm |
| F-number: | 1.2 |
| Maximum half angle of view: | 29.9° |
| Maximum image height: | 4.92 mm |
| Entire system focal length: | 9.01 mm |
| Back focus: | 7.08 mm (d6 + d7 + d8) |
| Total lens length: | 20.63 mm |

The first lens L1, the second lens L2, and the third lens L3 are each made of chalcogenide glass having a refractive index N10 of 3.465 measured at a wavelength of 10 μm. The parallel flat plate P is made of silicon (Si). The object-side surface (fifth surface) of the third lens L3 is a diffractive surface obtained by forming a sag on a spherical surface. The sag has a depth in a range corresponding to 0 to a design center wavelength (see the definitional equation of $Z_{DOE}$). The back focus of 7.08 mm is an actual distance.

The first lens L1 has a focal length f1 of 24.16 mm. Thus, a ratio of the focal length f1 to the focal length f of the infrared imaging lens 3 is as follows.

$$f1/f=2.7$$

The second lens L2 has a focal length f2 of 44.44 mm. The third lens L3 has a focal length f3 of 9.77 mm. Thus, the third lens L3 and the first lens L1 have the highest power and the second highest power, respectively. A ratio of the focal length f3 of the third lens L3 to the focal length f of the infrared imaging lens 3 is as follows.

$$f3/f=1.1$$

A maximum image height on the image surface S is 4.92 mm. As such, the image circle has a diameter φs of 9.84 mm. A ratio of the diameter φs of the image circle of the infrared imaging lens 3 to the focal length f of the infrared imaging lens 3 is as follows.

$$φs/f=1.09$$

That is, the infrared imaging lens 3 is a standard lens. Further, the infrared imaging lens 3 has a half angle of view of 29.9°. This is within a range of 21° to 36°, within which the infrared imaging lens 3 can be regarded as a standard lens.

The infrared imaging lens 3 is as compact as having (i) a total lens length L of 20.6 mm as measured from the first surface to the image surface S and (ii) a maximum effective diameter on an optical path of 14.5 mm. A ratio of the total lens length L of the infrared imaging lens to the focal length f of the infrared imaging lens is as follows.

$$L/f=2.3$$

The infrared imaging lens is thus configured such that the total lens length L is not too greater than the focal length f.

Further, the infrared imaging lens 3 has a triple-lens configuration and can be made lightweight. Combined with the fact that each lens can be press-molded, the infrared imaging lens 3 can be produced at a low cost that allows the infrared imaging lens 3 to be applied to a commercial use.

In Numerical Example 3, a ratio of the back focus BF to the focal length f of the infrared imaging lens is as follows.

$$BF/f=0.79$$

Thus, a sufficient back focus is secured.

Figure 15:
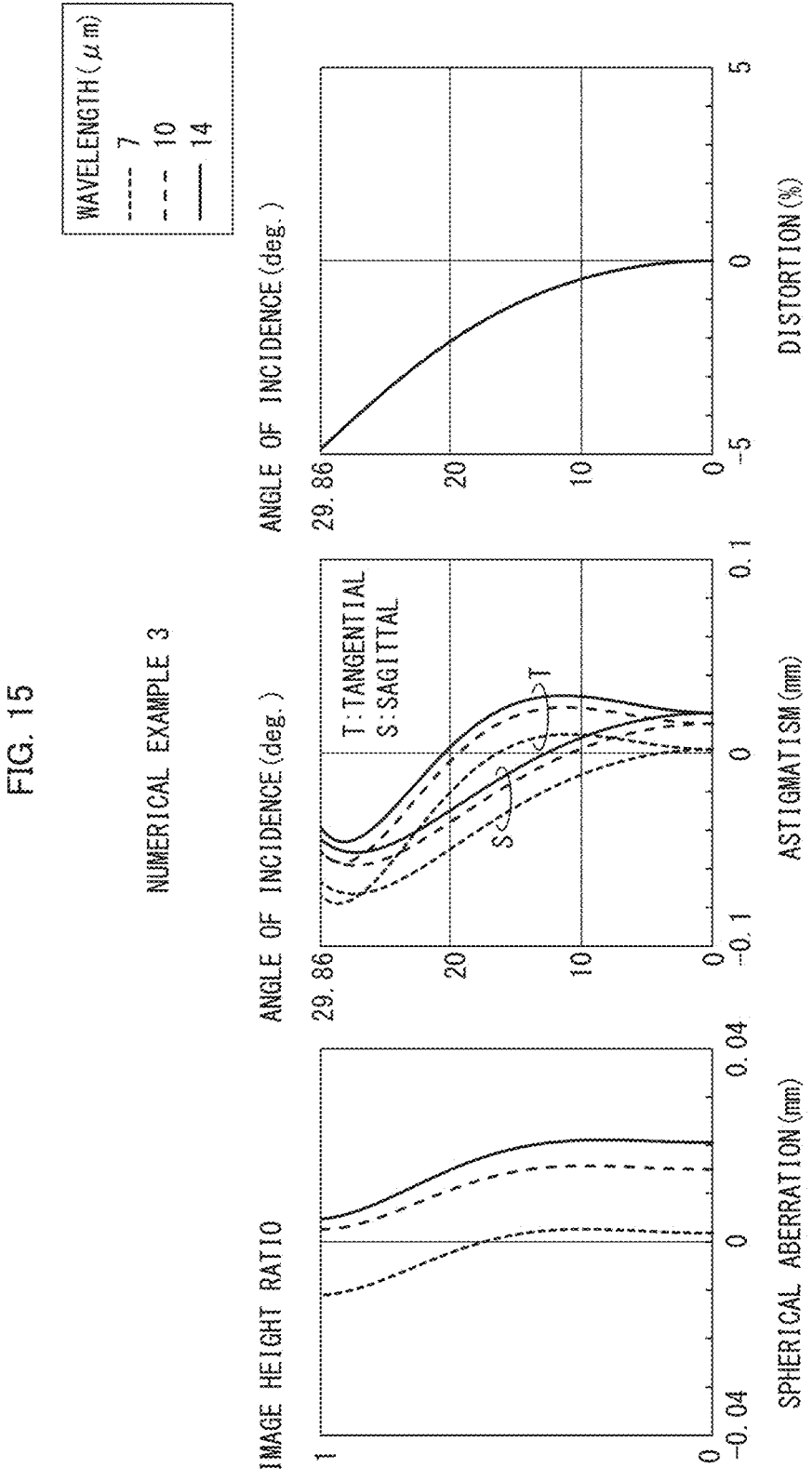
FIG. 15 is an aberration diagram illustrating spherical aberration, astigmatism, and distortion of the infrared imaging lens in accordance with Numerical Example 3 of the present invention.
Figure 16:
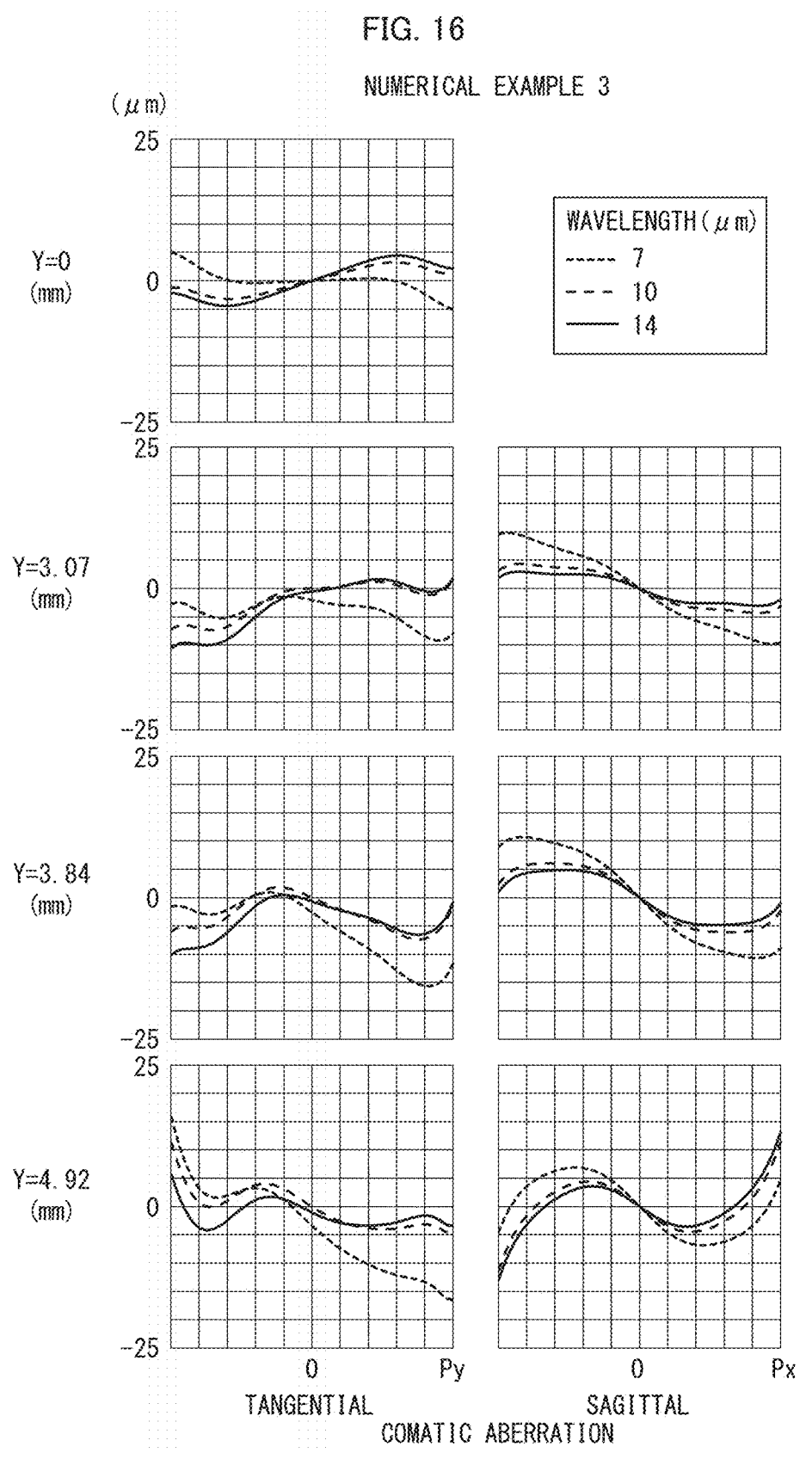
Figure 17:
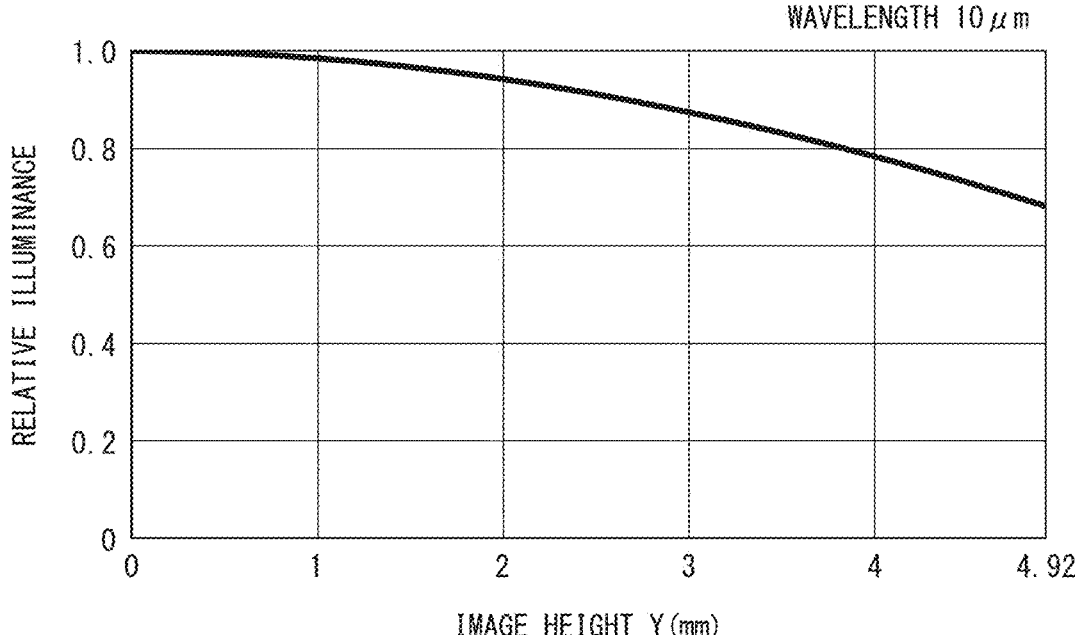
FIG. 17 is a graph showing image height dependence of a relative illuminance of the infrared imaging lens in accordance with Numerical Example 3 of the present invention.

Various performance capabilities of the infrared imaging lens 3 of Numerical Example 3 are illustrated in FIGS. 15 to 19. FIG. 15 is an aberration diagram of the infrared imaging lens 3. FIG. 15 illustrates spherical aberration, astigmatism, and distortion. For each, graphs corresponding to respective wavelengths ranging from 7 μm to 14 μm are shown. FIG. 16 is an aberration diagram illustrating comatic aberration at each image height Y ranging from 0 mm up to a maximum image height of 4.92 mm, for each of a tangential (meridional) direction and a sagittal (radial) direction. As illustrated in FIGS. 15 and 16, the infrared imaging lens 3 in accordance with Numerical Example 3 has various types of aberration satisfactorily corrected over a wide wavelength region of 7 μm to 14 μm. FIG. 17 is a graph showing a relative illuminance with respect to an image height Y of the infrared imaging lens 3 in accordance with Numerical Example 3. As illustrated in FIG. 17, even at a maximum image height of 4.92 mm, a satisfactory peripheral light quantity as much as a relative illuminance of 0.68 is obtained.

In a case where an image sensor having a 640×512 pixels (VGA+) and an effective diagonal length of 9.84 mm is used, an image height Y corresponding to a center of right and left ends of an imaging surface is 3.84 mm, and a relative illuminance at that image height is 0.80. Further, in this case, an image height Y corresponding to a center of upper and lower ends of the imaging surface is 3.07 mm, and a relative illuminance at that image height is 0.87.

Figure 18:
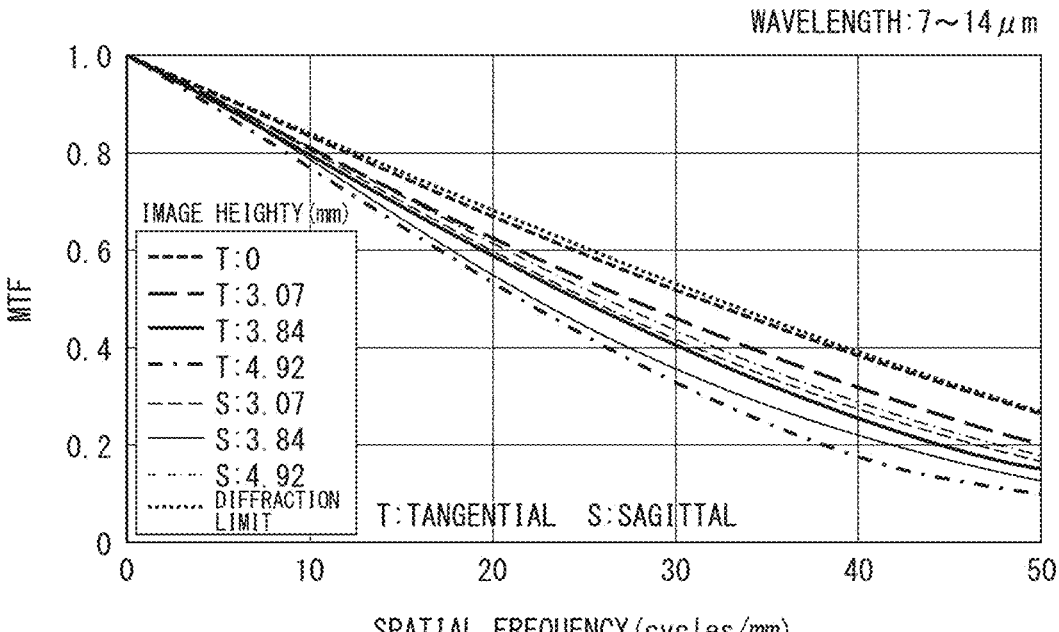
FIG. 18 is a graph showing spatial frequency dependence of an MTF of the infrared imaging lens in accordance with Numerical Example 3 of the present invention.

FIG. 18 is a graph showing spatial frequency dependence of an MTF in a wavelength range of 8 μm to 14 μm. At a spatial frequency of 41.7 cycles/mm corresponding to a pixel pitch of 12 μm, an MTF of not less than 0.21, which is sufficiently higher than 0.17, is secured at each image height Y in terms of a simple average of an MTF in the tangential direction and an MTF in the sagittal direction. At this time, at an image height Y of 0 mm, that is, at a center of the image, a good resolution as high as an MTF of 0.36 is exhibited.

Further, at a spatial frequency of 20.85 cycles/mm, an MTF of not less than 0.55, which is sufficiently higher than is secured at each image height Y in terms of a simple average of an MTF in the tangential direction and an MTF in the sagittal direction. The infrared imaging lens 3 in accordance with Numerical Example 3 exhibits, over the entire area of the image circle, a resolution that is suited to an image sensor having a narrow pixel pitch approximately equivalent to a wavelength and that is considered good as a resolution of an infrared imaging lens having an F-number of 1.2.

Figure 19:
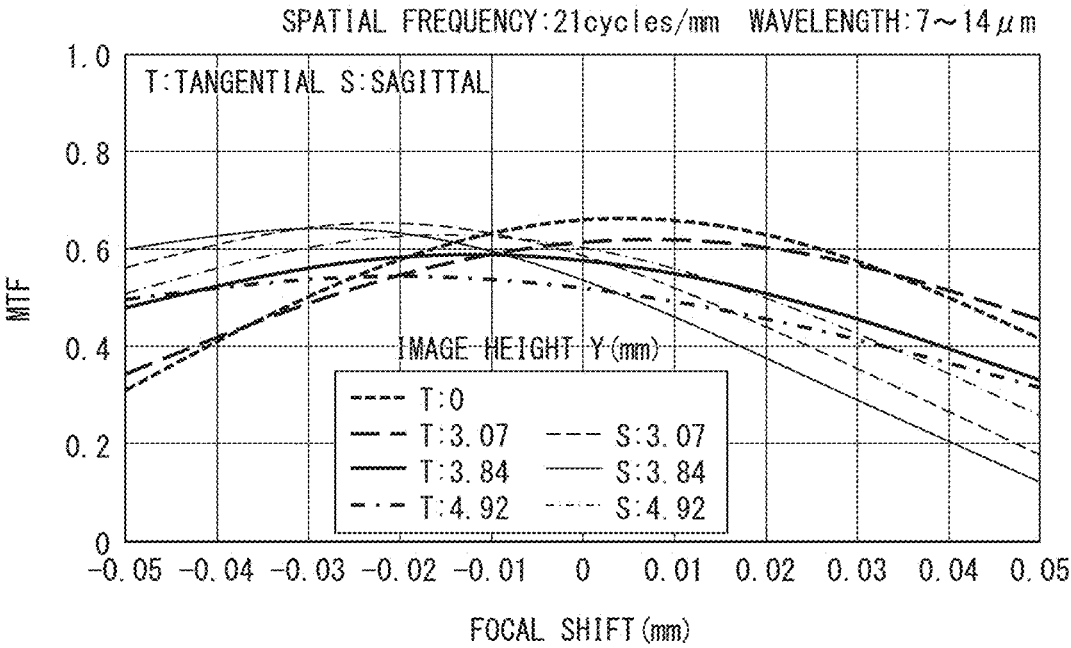
FIG. 19 is a graph showing focal shift dependence of an MTF of the infrared imaging lens in accordance with Numerical Example 3 of the present invention.

FIG. 19 is a graph showing a change, with respect to a focal shift, in MTF in a wavelength range of 7 μm to 14 μm. Further, the infrared imaging lens 3 in accordance with Numerical Example 3 is designed to have an F-number of 1.2, which is greater than an F-number of the infrared imaging lens in accordance with Numerical Example 1. This makes it possible to obtain a deeper focal depth.

As described above, the infrared imaging lens 3 in accordance with Numerical Example 3 can cover a wavelength range of 7 μm to 14 μm and has a good resolution sufficiently suited to an image sensor having a pixel pitch of approximately 12 μm. Further, the infrared imaging lens 3 in accordance with Numerical Example 3 is as bright as having an F-number of 1.2, and is compact. Numerical Example 3 thus makes it possible to provide an infrared imaging lens which, unlike conventional infrared imaging lenses, is compact and has excellent properties.

Aspects of the present invention can also be expressed as follows:

A first aspect of the present invention is an infrared imaging lens including a plurality of lenses which are disposed in respective positions, the plurality of lenses each being made of glass having a refractive index of 2.8 to 4.0 measured at a wavelength of 10 μm, the infrared imaging lens having an image circle having a diameter which is 0.7 times to 1.3 times a focal length of the infrared imaging lens. The configuration makes it possible to provide an infrared imaging lens which is compatible with an image sensor having a pixel pitch approximately equivalent to a wavelength, which is excellent in resolution, and which is a standard lens.

In a second aspect of the present invention, the infrared imaging lens in accordance with the first aspect can be configured such that the infrared imaging lens has, in the image circle, a modulation transfer function of not less than in a wavelength range of 7 μm to 14 μm at a spatial frequency of 41.7 cycles/mm. With the configuration, a relationship between the pixel pitch approximately equivalent to a wavelength and the resolution is more specifically limited.

A third aspect of the present invention is an infrared imaging lens including a plurality of lenses which are disposed in respective positions, the plurality of lenses each being made of glass having a refractive index of 2.8 to 4.0 measured at a wavelength of 10 μm, the infrared imaging lens having, in the image circle, a modulation transfer function of not less than 0.17 in a wavelength range of 7 μm to 14 μm at a spatial frequency of 41.7 cycles/mm. The configuration makes it possible to provide an infrared imaging lens which is compatible with an image sensor having a pixel pitch approximately equivalent to a wavelength, which is excellent in resolution, and which is a standard lens.

In a fourth aspect of the present invention, the infrared imaging lens in accordance with any one of the first to third aspects can be configured such that a first lens disposed closest to an object side has positive power and a meniscus shape that is convex to the object side. The configuration makes it possible to provide an infrared imaging lens which is excellent in aberration properties.

In a fifth aspect of the present invention, the infrared imaging lens in accordance with the fourth aspect can be configured such that a focal length f1 of the first lens and a focal length f of the infrared imaging lens satisfy the following relational expression:

$$1.0 \leq f1/f \leq 2.9.$$

The configuration makes it possible to reduce an outer diameter and a volume of the infrared imaging lens.

In a sixth aspect of the present invention, the infrared imaging lens in accordance with the fourth or fifth aspect can be configured such that an effective diameter of an object-side surface of the first lens serves as an aperture of the infrared imaging lens. The configuration makes it possible to reduce vignetting of peripheral light beams and increase peripheral light quantity.

In a seventh aspect of the present invention, the infrared imaging lens in accordance with any one of the fourth to sixth aspects can be configured such that the first lens, a second lens, and a third lens are disposed in this order from the object side to an image surface side. The configuration allows an infrared imaging lens to be compact and lightweight while maintaining a high resolution.

In an eighth aspect of the present invention, the infrared imaging lens in accordance with the seventh aspect can be configured such that the second lens and the third lens each have positive power. The configuration makes it possible to provide an infrared imaging lens which is excellent in aberration properties.

In a ninth aspect of the present invention, the infrared imaging lens in accordance with the eighth aspect can be configured such that: the third lens has a highest power among the first lens, the second lens, and the third lens; and the third lens has a meniscus shape that is convex to the image surface side. The configuration reduces astigmatism.

In a tenth aspect of the present invention, the infrared imaging lens in accordance with any one of the seventh to ninth aspects can be configured such that the second lens has a meniscus shape that is convex to the image surface side. The configuration makes it possible to suppress an increase in Petzvar sum, so that field curvature is prevented or reduced.

In an eleventh aspect of the present invention, the infrared imaging lens in accordance with any one of the seventh to tenth aspects can be configured such that at least one of an image surface-side surface of the second lens and an object-side surface of the third lens is a diffractive surface. The configuration makes it possible to reduce transverse chromatic aberration.

In a twelfth aspect of the present invention, the infrared imaging lens in accordance with any one of the seventh to tenth aspects can be configured such that a focal length f3 of the third lens and a focal length f of the infrared imaging lens satisfy the following relational expression:

$$0.8 \leq f3/f \leq 1.2.$$

The configuration makes it possible to obtain a good resolution throughout the area of a large image circle.

In a thirteenth aspect of the present invention, the infrared imaging lens in accordance with any one of the first to twelfth aspects can be configured such that the infrared imaging lens has a half angle of view of 21° to 36°. The configuration allows an infrared imaging lens to have an angle of view that is preferable as an angle of view of a standard lens.

In a fourteenth aspect of the present invention, the infrared imaging lens in accordance with any one of the first to thirteenth aspects can be configured such that the infrared imaging lens has, in the image circle, a modulation transfer function of not less than 0.50 in a wavelength range of 7 μm to 14 μm at a spatial frequency of 20.85 cycles/mm. The configuration makes it possible to provide an infrared imaging lens having a good MTF over an entire range from a spatial frequency of 0 cycles/mm to 41.7 cycles/mm, which is equivalent to a targeted Nyquist frequency.

In a fifteenth aspect of the present invention, the infrared imaging lens in accordance with any one of the first to fourteenth aspects can be configured such that the infrared imaging lens has a relative illuminance of not less than 40% on the image surface in the image circle. The configuration makes it possible to provide an infrared imaging lens having a sufficient peripheral light quantity secured.

In a sixteenth aspect of the present invention, the infrared imaging lens in accordance with any one of the first to fifteenth aspects can be configured such that the glass is chalcogenide glass. The configuration makes it possible to configure an infrared imaging lens with use of a lens having an aspherical surface including a diffractive surface, and makes it possible to produce an imaging lens which is particularly excellent in aberration properties and resolution.

In a seventeenth aspect of the present invention, the infrared imaging lens in accordance with the sixteenth aspect can be configured such that the chalcogenide glass has an infrared absorption edge wavelength of not less than 18 μm at which the chalcogenide glass has a light transmittance of 20% measured at a thickness of 2 mm. The configuration makes it possible to configure an infrared imaging lens which exhibits very little light absorption in a wavelength range of interest.

In an eighteenth aspect of the present invention, the infrared imaging lens in accordance with any one of the first to seventeenth aspects can be configured such that the infrared imaging lens has an F-number of 1.0 to 1.2. The configuration makes it possible to configure a bright standard lens. Further, the configuration makes it possible to provide a standard lens which is excellent in resolution.

In a nineteenth aspect of the present invention, the infrared imaging lens in accordance with any one of the first to eighteenth aspects can be configured such that the infrared imaging lens has a focal length of 7 mm to 12 mm. The configuration makes it possible to configure an infrared imaging lens which is both compact and excellent in various properties such as resolution and brightness. Further, the configuration makes it possible to configure an infrared imaging lens which is excellent in various properties and low in cost so as to be available for commercial use.

In a twentieth aspect of the present invention, the infrared imaging lens in accordance with any one of the first to nineteenth aspects can be configured such that the infrared imaging lens has a total lens length of not more than 30 mm. The configuration makes it possible to configure an infrared imaging lens which is both compact and excellent in various properties such as resolution and brightness. Further, the configuration makes it possible to configure an infrared imaging lens which is excellent in various properties and low in cost so as to be available for commercial use.

An infrared camera in accordance with a twenty first aspect of the present invention includes: an infrared imaging lens recited in any one of the first to twentieth aspects; and an infrared image sensor. The configuration makes it possible to provide an infrared camera which is both compact and excellent in various properties such as resolution and brightness. Further, the configuration makes it possible to provide an infrared camera which is excellent in various properties and low in cost so as to be available for various commercial uses.

The present invention is not limited to the embodiments, but can be altered by a skilled person in the art within the scope of the claims. The present invention also encompasses, in its technical scope, any embodiment derived by combining technical means disclosed herein. Further, it is possible to form a new technical feature by combining the technical means disclosed herein.

The embodiment has shown an example in which an infrared imaging lens includes three lenses disposed in respective positions. However, application of the present invention is not limited to this, and it is possible to configure an infrared imaging lens which includes a plurality of lenses disposed in respective positions, the number of the plurality of lenses being other than three.

REFERENCE SIGNS LIST

1, 2, 3 Infrared imaging lens
L1 First lens
L2 Second lens
L3 Third lens
P Parallel flat plate
S Image surface

The invention claimed is:

1. An infrared imaging lens, comprising a plurality of lenses which are disposed in respective positions, the plurality of lenses each being made of glass having a refractive index of 2.8 to 4.0 measured at a wavelength of 10 μm, wherein a first lens, a second lens, and a third lens are disposed in this order from an object side to an image surface side, the third lens has positive power and a meniscus shape that is convex to the image surface side, and the infrared imaging lens has an image circle on an image surface, the image circle having a diameter which is 0.7 time to 1.3 times a focal length of the infrared imaging lens.

2. The infrared imaging lens as set forth in claim 1, wherein the infrared imaging lens has, in the image circle, a modulation transfer function of not less than 0.17 in a wavelength range of 7 μm to 14 μm at a spatial frequency of 41.7 cycles/mm.

3. An infrared imaging lens, comprising a plurality of lenses which are disposed in respective positions, the plurality of lenses each being made of glass having a refractive index of 2.8 to 4.0 measured at a wavelength of 10 μm, the infrared imaging lens having, in the image circle, a modulation transfer function of not less than 0.17 in a wavelength range of 7 μm to 14 μm at a spatial frequency of 41.7 cycles/mm.

4. The infrared imaging lens as set forth in claim 1, wherein the first lens has positive power and a meniscus shape that is convex to the object side.

5. The infrared imaging lens as set forth in claim 4, wherein a focal length f1 of the first lens and a focal length f of the infrared imaging lens satisfy the following relational expression:

$$1.0 \le f1/f \le 2.9.$$

6. The infrared imaging lens as set forth in claim 4, wherein an effective diameter of an object-side surface of the first lens serves as an aperture of the infrared imaging lens.

7. The infrared imaging lens as set forth in claim 4, wherein the second lens has positive power.

8. The infrared imaging lens as set forth in claim 7, wherein the third lens has a highest power among the first lens, the second lens, and the third lens.

9. The infrared imaging lens as set forth in claim 4, wherein the second lens has a meniscus shape that is convex to the image surface side.

10. The infrared imaging lens as set forth in claim 4, wherein at least one of an image surface-side surface of the second lens and an object-side surface of the third lens is a diffractive surface.

11. The infrared imaging lens as set forth in claim 4, wherein a focal length f3 of the third lens and a focal length f of the infrared imaging lens satisfy the following relational expression:

$$0.8 \leq f3/f \leq 1.2.$$

12. The infrared imaging lens as set forth in claim 1, wherein the infrared imaging lens has a half angle of view of 21° to 36°.

13. The infrared imaging lens as set forth in claim 1, wherein the infrared imaging lens has, in the image circle, a modulation transfer function of not less than 0.50 in a wavelength range of 7 μm to 14 μm at a spatial frequency of 20.85 cycles/mm.

14. The infrared imaging lens as set forth in claim 1, wherein the infrared imaging lens has a relative illuminance of not less than 40% on the image surface in the image circle.

15. The infrared imaging lens as set forth in claim 1, wherein the glass is chalcogenide glass.

16. The infrared imaging lens as set forth in claim 15, wherein the chalcogenide glass has an infrared absorption edge wavelength of not less than 18 μm at which the chalcogenide glass has a light transmittance of 20% measured at a thickness of 2 mm.

17. The infrared imaging lens as set forth in claim 1, wherein the infrared imaging lens has an F-number of 1.0 to 1.2.

18. The infrared imaging lens as set forth in claim 1, wherein the infrared imaging lens has a focal length of 7 mm to 12 mm.

19. The infrared imaging lens as set forth in claim 1, wherein the infrared imaging lens has a total lens length of not more than 30 mm.

20. An infrared camera, comprising:

an infrared imaging lens recited in claim 1; and an infrared image sensor.

* * * * *